United States Patent
Tomiyasu et al.

(10) Patent No.: US 10,341,832 B2
(45) Date of Patent: Jul. 2, 2019

(54) COOPERATIVE SYSTEM, INFORMATION PROCESSING DEVICE, COOPERATION METHOD, AND COOPERATIVE PROGRAM

(71) Applicant: Konica Minolta, Inc., Tokyo (JP)

(72) Inventors: Kazuhiro Tomiyasu, Toyokawa (JP); Yoichi Kurumasa, Toyokawa (JP); Shoko Haba, Toyokawa (JP); Mie Kawabata, Toyokawa (JP); Ryosuke Nishimura, Toyokawa (JP); Zhenhuan Qu, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 50 days.

(21) Appl. No.: 15/720,228

(22) Filed: Sep. 29, 2017

(65) Prior Publication Data

US 2018/0124548 A1 May 3, 2018

(30) Foreign Application Priority Data

Nov. 2, 2016 (JP) .................................. 2016-215488

(51) Int. Cl.
| | |
|---|---|
| *H04W 4/00* | (2018.01) |
| *H04W 4/70* | (2018.01) |
| *H04J 3/06* | (2006.01) |
| *H04L 1/00* | (2006.01) |
| *H04L 29/04* | (2006.01) |
| *H04W 56/00* | (2009.01) |
| *H04L 29/08* | (2006.01) |

(Continued)

(52) U.S. Cl.
CPC ............ *H04W 4/70* (2018.02); *H04J 3/0602* (2013.01); *H04L 1/0076* (2013.01); *H04L 29/04* (2013.01); *H04L 67/02* (2013.01); *H04L 67/04* (2013.01); *H04L 67/08* (2013.01); *H04L 67/18* (2013.01); *H04W 56/001* (2013.01)

(58) Field of Classification Search
CPC ... H04W 4/005; H04W 56/001; H04J 3/0602; H04L 1/0076; H04L 29/04; H04L 67/04; H04L 67/02; H04L 67/18; G07F 17/3218; G07F 17/34; G06F 3/1454; H04M 1/7253; H04M 1/72544; H04M 2250/16
See application file for complete search history.

(56) References Cited

U.S. PATENT DOCUMENTS

| | | | |
|---|---|---|---|
| 10,217,317 B2* | 2/2019 | Nelson | G07F 17/3209 |
| 2010/0113148 A1* | 5/2010 | Haltovsky | G06F 1/1626 463/30 |
| 2013/0130777 A1* | 5/2013 | Lemay | G07F 17/3218 463/25 |

FOREIGN PATENT DOCUMENTS

JP 2008-123476 A 5/2008

* cited by examiner

*Primary Examiner* — Jung Liu
(74) *Attorney, Agent, or Firm* — Osha Liang LLP

(57) ABSTRACT

An information processing device of a cooperative system that further includes a portable device includes: a display that displays an image; a position detector that detects a position on a display surface of the display with which an object has made contact; and a hardware processor that detects the portable device in response to the position detector detecting a position with which an object has made contact, establishes a communication path with the portable device, switches an independent mode not cooperating with the portable device to a cooperation mode cooperating with the portable device when a communication path with the portable device is established and the portable device is detected by the hardware processor, and displays a related image that is related to the portable device on the display in response to the hardware processor no longer detecting the portable device in the cooperation mode.

16 Claims, 12 Drawing Sheets

COOPERATIVE SYSTEM, INFORMATION PROCESSING DEVICE, COOPERATION METHOD, AND COOPERATIVE PROGRAM

Japanese Patent Application No. 2016-215488 filed on Nov. 2, 2016, including description, claims, drawings, and abstract the entire disclosure is incorporated herein by reference in its entirety.

TECHNOLOGICAL FIELD

The present invention relates to a cooperative system, an information processing device, a cooperation method, and a cooperative program, and more particularly, to a cooperative system including a portable device carried by a user and an information processing device that executes cooperative processing in cooperation with this portable device, this information processing device, a cooperation method and a cooperative program executed by this information processing device.

BACKGROUND

In recent years, a technology of remotely operating an image processing device such as a multi function peripheral (MFP) with a portable device such as a smartphone or a personal digital assistant (PDA) carried by a user has been known.

For example, JP 2008-123476 A describes an image processing device that determines whether an operation of touching a display surface of a liquid crystal panel is caused by a portable information terminal placed on the display surface or a user's instruction with a finger and, when it is determined that the operation is caused by the portable information terminal, establishes a communication path with the portable information terminal only while the portable information terminal is placed on the display surface to display a processing menu screen for the portable information terminal.

However, there is a case where other processing is executed on the portable information terminal while the portable information terminal is placed on the liquid crystal panel because, for example, this portable information terminal receives an incoming call from the outside. In this case, settings of the portable information terminal are interrupted and cannot be continued. In addition, the user cannot judge whether settings of the portable information terminal are continuing or have been interrupted.

SUMMARY

One or more embodiments of the present invention provide a cooperative system capable of notifying a state of cooperation maintained between two devices while two devices are not in contact.

One or more embodiments of the present invention provide an information processing device capable of notifying a state of cooperation maintained with a portable device while the portable device is not in contact.

One or more embodiments of the present invention provide a cooperation method capable of notifying a state of cooperation maintained with a portable device while the portable device is not in contact.

One or more embodiments of the present invention provide a cooperative program capable of notifying a state of cooperation maintained with a portable device while the portable device is not in contact.

According to one or more embodiments of the present invention, a cooperative system comprises an information processing device and a portable device carried by a user, wherein the information processing device includes: a display that displays an image; a position detector that detects a position on a display surface of the display with which an object has made contact; and a hardware processor that detects the portable device in response to the position detector detecting a position with which an object has made contact, establishes a communication path with the portable device, switches an independent mode not cooperating with the portable device to a cooperation mode cooperating with the portable device when a communication path with the portable device is established and the portable device is detected by the hardware processor, and displays a related image relating to the portable device on the display in response to the hardware processor no longer detecting the portable device in the cooperation mode.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
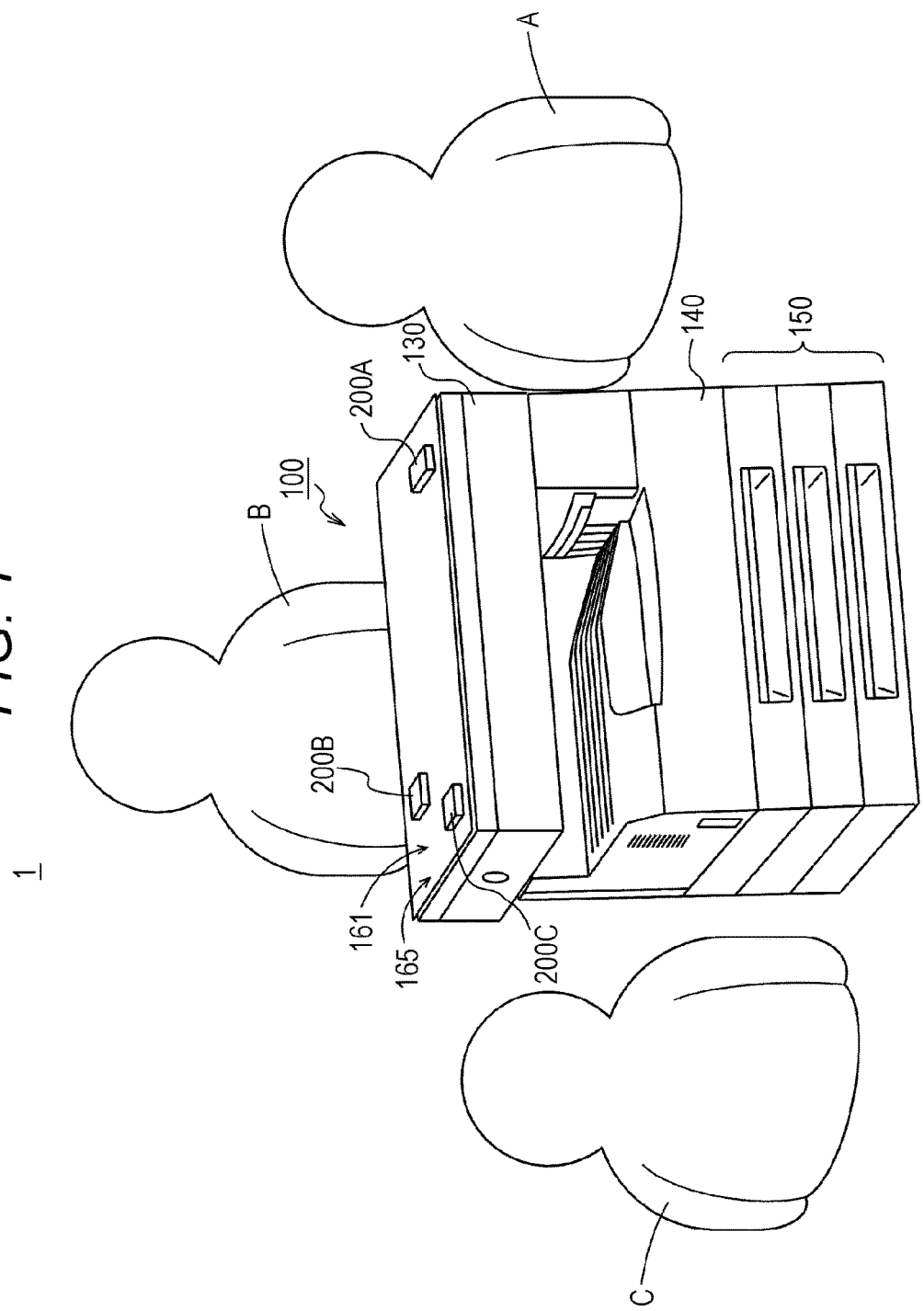
FIG. 1 is a diagram illustrating an example of an overall outline of a cooperative system according to one or more embodiments of the present invention.

Hereinafter, one or more embodiments of the present invention will be described with reference to the drawings.

However, the scope of the invention is not limited to the disclosed embodiments. In the following description, the same members are denoted by the same reference numerals. The names and functions thereof are also the same. Therefore, detailed description thereof will not be repeated.

FIG. 1 is a diagram illustrating an example of an overall outline of a cooperative system according to one or more embodiments of the present invention. Referring to FIG. 1, the cooperative system 1 includes a multi function peripheral (MFP) 100 and smartphones 200A, 200B, and 200C. The example here depicts a case where three users A, B, and C carry the smartphones 200A, 200B, and 200C, respectively, and operate the MFP 100 at the same time.

Note that, although description will be made here using as an example a case where the three users A, B, and C operate the MFP 100 at the same time, the number of users is not limited thereto and it is only required that one or more users operate the MFP 100.

In one or more embodiments, the MFP 100 is an example of an information processing device and includes a display 161, a touch panel 165, a document reader 130 that reads a document, an image former 140 that forms an image on a sheet or the like based on data, and a paper feeder 150 that supplies a sheet to the image former 140. The display 161 is a display device such as a liquid crystal display (LCD) device or an organic electro-luminescence display (ELD). The display 161 is provided on an upper surface of a main body of the MFP 100. The touch panel 165 is provided so as to be superimposed on an upper surface or a lower surface of the display 161 and detects a position on a display surface of the display 161 with which an object has made contact. The touch panel 165 is a multi-touch compatible touch panel. Therefore, when an object makes contact with a plurality of places on the display surface of the display 161 at a time, the touch panel 165 can detect a plurality of positions with which the object has made contact. The object here includes the smartphones 200A, 200B, 200C in addition to a user's finger.

Note that a single touch panel 165 may be used, or a plurality of touch panels 165 may be combined. In a case where the touch panel 165 is constituted by a combination of a plurality of touch panels, for example, the display surface of the display 161 is simply divided into a plurality of regions such that the plurality of touch panels is inked with the plurality of respective regions. For example, a resistance film technique, a surface acoustic wave technique, an infrared technique, an electromagnetic induction technique, and a capacitance technique can be used for the touch panel 165 and the technique therefor is not limited.

Each of the three users A, B, and C is located around the MFP 100. The MFP 100 can be used for a meeting in which the users A, B, and C participate. Since each of the users A, B, and C is located around the MFP 100, the users A, B, and C can visually recognize the entire display surface of the display 161. Therefore, if data prepared for the meeting is, for example, stored to the MFP 100 in advance, the same data can be shown to the users A, B, and C at the same time by displaying this data on the display 161. In addition, the touch panel 165 of the MFP 100 is used as an input device for the users A, B, and C to operate the MFP 100. For example, when an application program for editing a document is installed in the MFP 100, the MFP 100 may be used to create a document using the touch panel 165 as a keyboard.

The smartphones 200A, 200B, and 200C are examples of a portable device and are carried and used by the users A, B, and C, respectively. The users A, B, and C place the smartphones 200A, 200B, and 200C on the display surface of the display 161. Therefore, each of the smartphones 200A, 200B, and 200C is arranged on the display surface of the display 161 in the vicinity of a side in a direction in which each of the users A, B, and C is located. In this case, since the touch panel 165 detects each of the smartphones 200A, 200B, and 200C, the MFP 100 can detect the positions of the respective smartphones 200A, 200B, and 200C.

Each of the MFP 100 and the smartphones 200A, 200B, and 200C has a short-range wireless communication function and can communicate with each other on a one-to-one basis when the other device is located within a predetermined range. In addition, each of the MFP 100 and the smartphones 200A, 200B, and 200C has a wireless LAN function and can communicate with a wireless base station connected to a network. The wireless base station is a relay device for the network and communicates with the MFP 100 and the smartphones 200A, 200B, and 200C to connect each of the MFP 100 and the smartphones 200A, 200B, and 200C to the network. Therefore, the MFP 100 and the smartphones 200A, 200B, and 200C can communicate with each other via the network by individually communicating with the wireless base station. The network is, for example, a local area network (LAN) and the connection form may be wired or wireless. The network may also be connected to the Internet. In this case, each of the MFP 100 and the smartphones 200A, 200B, and 200C can communicate with a computer connected to the Internet. In addition, the network is not limited to the LAN but may be a network using public switched telephone networks, or the like. Additionally, the network may be a wide area network (WAN) such as the Internet.

In the cooperative system 1 according to one or more embodiments, any of the smartphones 200A, 200B, and 200C, and the MFP 100 can cooperatively execute cooperative processing. For example, the smartphone 200A and the MFP 100 communicate using a short-range communication function or a wireless LAN function to execute the cooperative processing in cooperation with each other. A series of multiple items of processing are defined in the cooperative processing. The series of multiple items of processing defined by the cooperative processing includes device-side processing executed by the MFP 100 and portable-side processing executed by the smartphone 200A. For example, in a case where the MFP 100 and the smartphone 200A execute cooperative processing whose portable-side processing is processing of selecting data and whose device-side processing is processing of forming an image, this cooperative processing is processing in which the MFP 100 forms an image of data stored in the smartphone 200A, which has been selected by the user A operating the smartphone 200A, on a sheet in accordance with an image formation condition set by the user A operating the MFP 100. In addition, in a case where the device-side processing is processing of selecting data and the portable-side processing is processing of transmitting the data, the cooperative processing executed by the MFP 100 and the smartphone 200A is processing in which the smartphone 200A transmits data stored in the MFP 100, which has been selected by the user A operating the MFP 100, in accordance with a transmission condition set by the user A operating the smartphone 200A. The transmission condition is, for example, settled by the user selecting a destination and a transmission method according to an address book stored in the smartphone 200A.

Note that the smartphones 200A, 200B, and 200C will be described as an example of the portable device carried by the user, but personal digital assistants (PDAs) or the like may be used as long as the device can be carried by the user.

Figure 2:
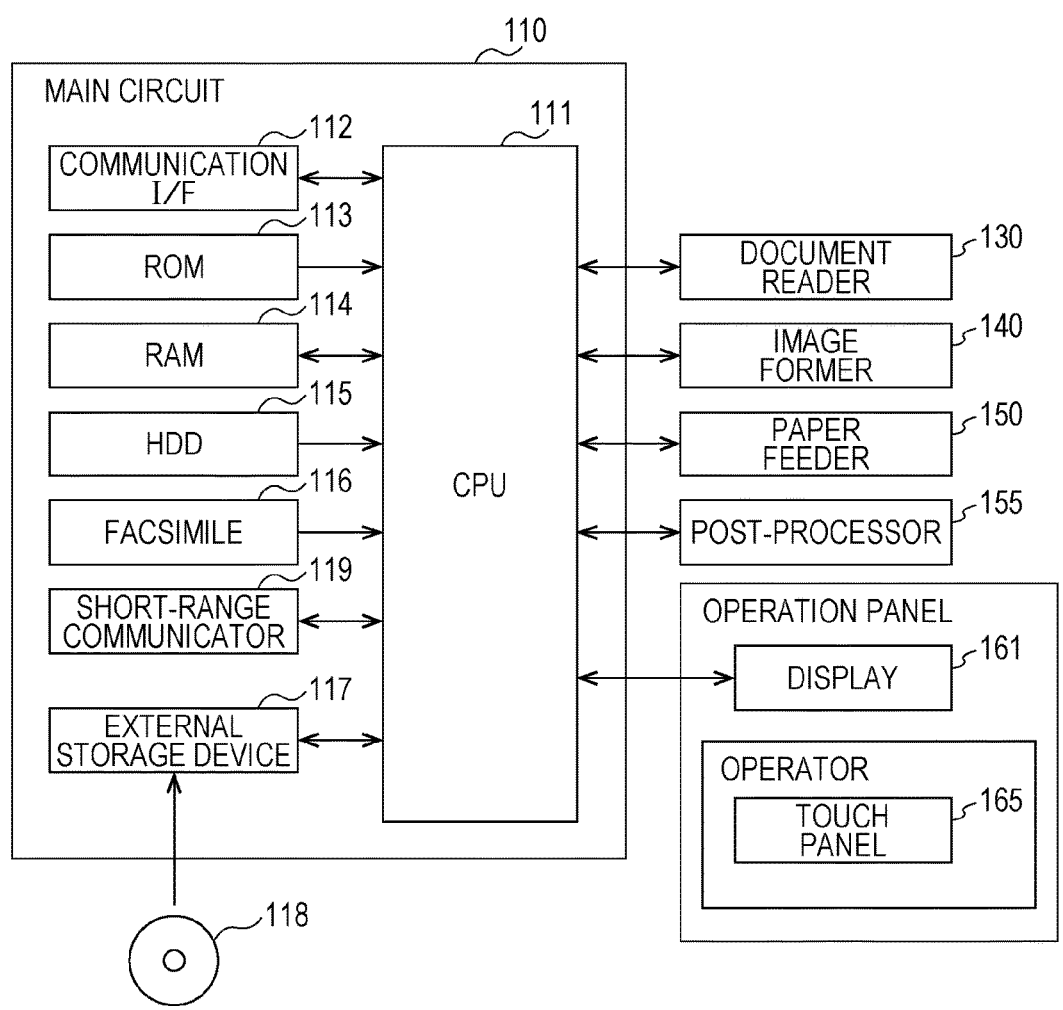
FIG. 2 is a block diagram illustrating an example of a hardware configuration of an MFP according to one or more embodiments.

FIG. 2 is a block diagram illustrating an example of a hardware configuration of the MFP according to one or more embodiments. Referring to FIG. 2, the MFP 100 includes a main circuit 110, the document reader 130, the image former 140, the paper feeder 150, the display 161, and the touch panel 165.

The main circuit 110 includes a CPU 111, a communication interface (I/F) 112, a ROM 113, a RAM 114, a hard disk drive (HDD) 115 as a mass storage device, a facsimile 116, an external storage device 117 to which a compact disc read only memory (CD-ROM) 118 is attached, and a short-range communicator 119. The CPU 111 is connected to the document reader 130, the image former 140, the paper feeder 150, the display 161, and the touch panel 165 and controls the entirety of the MFP 100.

The ROM 113 stores a program executed by the CPU 111 or data necessary for executing the program. The RAM 114 is used as a work area when the CPU 111 executes a program. In addition, the RAM 114 temporarily stores read data (image data) successively sent from the document reader 130.

The communication I/F 112 is an interface for connecting the MFP 100 to the network. The CPU 111 communicates with each of the smartphones 200A, 200B, and 200C via the communication I/F 112 to transmit and receive data. In addition, the communication I/F 112 can communicate with a computer connected to the Internet via the wireless base station and the network.

The short-range communicator 119 wirelessly communicates with the smartphones 200A, 200B, and 200C based on a generic access profile (GAP) of the Bluetooth (registered trademark) standard, or the like. For example, once a distance to the smartphone 200A becomes equal to or less than a communicable distance, the short-range communicator 119 communicates with the smartphone 200A. The communicable distance of the short-range communicator 119 is several meters. In addition, the short-range communicator 119 may communicate using a short-range wireless communication technique of near field communication (NFC). In this case, the communicable distance of the short-range communicator 119 is several centimeters.

The facsimile 116 is connected to the public switched telephone networks (PSTN) and transmits facsimile data to the PSTN or receives facsimile data from the PSTN. The facsimile 116 stores the received facsimile data to the HDD 115 or outputs it to the image former 140. The image former 140 prints the facsimile data received by the facsimile 116 on a sheet. In addition, the facsimile 116 converts data stored in the HDD 115 into facsimile data to transmit to a facsimile device connected to the PSTN.

The CD-ROM 118 is attached to the external storage device 117. The CPU 111 can access the CD-ROM 118 via the external storage device 117. The CPU 111 loads a program recorded in the CD-ROM 118 attached to the external storage device 117 into the RAM 114 to execute. Note that a medium storing the program to be executed by the CPU 111 is not limited to the CD-ROM 118 and may be an optical disk (magnetic optical disc (MO)/mini disc (MD)/ digital versatile disc (DVD)), an IC card, an optical card, or a semiconductor memory such as a mask ROM, an erasable programmable ROM (EPROM), or an electrically EPROM (EEPROM).

In addition, the program executed by the CPU 111 is not limited to the program recorded in the CD-ROM 118 and a program stored in the HDD 115 may be loaded into the RAM 114 to be executed. In this case, another computer connected to the network may rewrite the program stored in the HDD 115 of the MFP 100 or writes a new program to add. Furthermore, the MFP 100 may download a program from another computer connected to the network and store this program to the HDD 115. The program mentioned herein includes not only a program directly executable by the CPU 111 but also a source program, a program subjected to compression processing, an encrypted program, and so on.

Since the basic hardware configuration and functions of the smartphones 200A, 200B, and 200C are the same, the smartphone 200A will be described here as an example.

Figure 3:
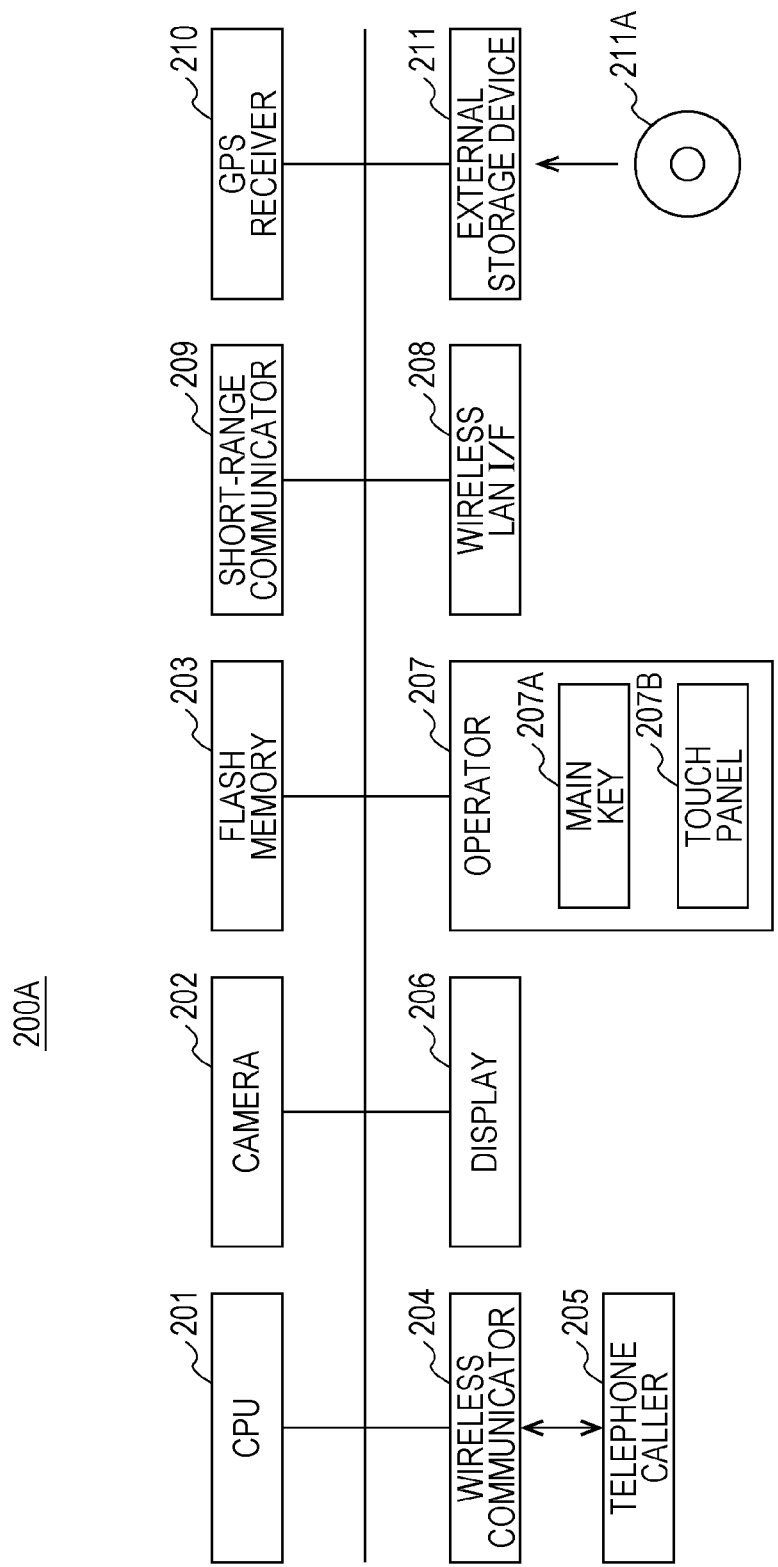
FIG. 3 is a block diagram illustrating an outline of a hardware configuration of a smartphone according to one or more embodiments.

FIG. 3 is a block diagram illustrating an outline of the hardware configuration of the smartphone according to the present embodiment. Referring to FIG. 3, the smartphone 200A according to one or more embodiments includes a CPU 201 for controlling the entirety of the smartphone 200A, a camera 202, a flash memory 203 that stores data in a nonvolatile manner, a wireless communicator 204 connected to a telephone caller 205, a display 206 that displays information, an operation member 207 that accepts user's operation, a wireless LAN I/F 208, a short-range communicator 209, a GPS receiver 210, an external storage device 211.

The display 206 is a display device such as a liquid crystal display (LCD) device or an organic ELD and displays an instruction menu for the user, information regarding the acquired image data, and the like. The operation member 207 includes a main key 207A and a touch panel 207B. In addition, when the user gives an instruction on the display surface of the display 206, the operation member 207 outputs a position on the display surface detected by the touch panel 207B to the CPU 201. Based on the position detected by the touch panel 207B, the CPU 201 detects a position instructed by the user on the screen displayed on the display 206. Based on the screen displayed on the display 206 and the position detected by the touch panel 207B, the CPU 201 accepts the input of data such as various instructions, characters, and numbers by the user's operation. For example, when a screen including an image of a numeric keypad is displayed on the display 206, a number corresponding to a key displayed at a position detected by the touch panel 207B is accepted.

The camera 202 includes a lens and a photoelectric conversion element and focuses light condensed by the lens on the photoelectric conversion element. The photoelectric conversion element photoelectrically converts the received light and outputs image data to the CPU 201. The photoelectric conversion element is a complementary metal oxide semiconductor (CMOS) sensor, a charge coupled device (CCD) sensor, or the like.

The wireless communicator 204 wirelessly communicates with a mobile phone base station connected to a telephone communication network. The wireless communicator 204 connects the smartphone 200A to the telephone communication network and allows a call using the telephone caller 205. The wireless communicator 204 decodes a sound signal obtained by demodulating a wireless signal received from the mobile phone base station to output to the telephone caller 205. In addition, the wireless communicator 204 encodes sound input from the telephone caller 205 to transmit to the mobile phone base station. The telephone caller 205 includes a microphone and a speaker and outputs sound input from the wireless communicator 204 through the speaker, while outputting sound input from the microphone to the wireless communicator 204. Furthermore, the wireless communicator 204 is controlled by the CPU 201 so as to connect the smartphone 200A to an e-mail server and transmit and receive an e-mail.

The wireless LAN I/F 208 is an interface for communicating with a wireless station connected to the network and connecting the smartphone 200A to the network. By registering an Internet protocol (IP) address of the MFP 100 to the smartphone 200A, the smartphone 200A can communicate with the MFP 100, thereby being able to transmit and receive data.

The short-range communicator 209 wirelessly communicates with another device, for example, the MFP 100 based on the GAP of the Bluetooth (registered trademark) standard, or the like. The short-range communicator 209 communicates with the MFP 100 when, for example, a distance to the MFP 100 becomes equal to or less than the communicable distance. The communicable distance of the short-range communicator 209 is several meters. In addition, the short-range communicator 209 may communicate using the short-range wireless communication technique of the NFC. In this case, the communicable distance of the short-range communicator 209 is several centimeters.

The GPS receiver 210 receives a signal issued from a global positioning system (GPS) satellite and detects a current position based on the received signal. The current position is, for example, latitude and longitude. The GPS receiver 210 outputs the detected current position to the CPU 201.

The flash memory 203 stores a program executed by the CPU 201 or data necessary for executing the program. The CPU 201 loads the program recorded in the flash memory 203 into a RAM included in the CPU 201 to execute.

The external storage device 211 is freely attachable to and detachable from the smartphone 200A and a CD-ROM 211A storing a remote operation program can be attached to the external storage device 211. The CPU 201 can access the CD-ROM 211A via the external storage device 211. The CPU 201 can load the remote operation program recorded in the CD-ROM 211A attached to the external storage device 211 into the RAM included in the CPU 201 to execute.

Although the program recorded in the flash memory 203 or the CD-ROM 210A has been described as the program executed by the CPU 201, a program obtained by another computer connected to the network by rewriting the program stored in the flash memory 203 or writing a new program to add may be employed. Additionally, a program downloaded by the smartphone 200A from another computer connected to the network may be employed. The program mentioned herein includes not only a program directly executable by the CPU 201 but also a source program, a program subjected to compression processing, an encrypted program, and so on.

Note that a medium storing the program executed by the CPU 201 is not limited to the CD-ROM 211A and may be an optical disk (MO/MD/DVD), an IC card, an optical card, or a semiconductor memory such as a mask ROM, an EPROM, or an EEPROM.

Figure 4:
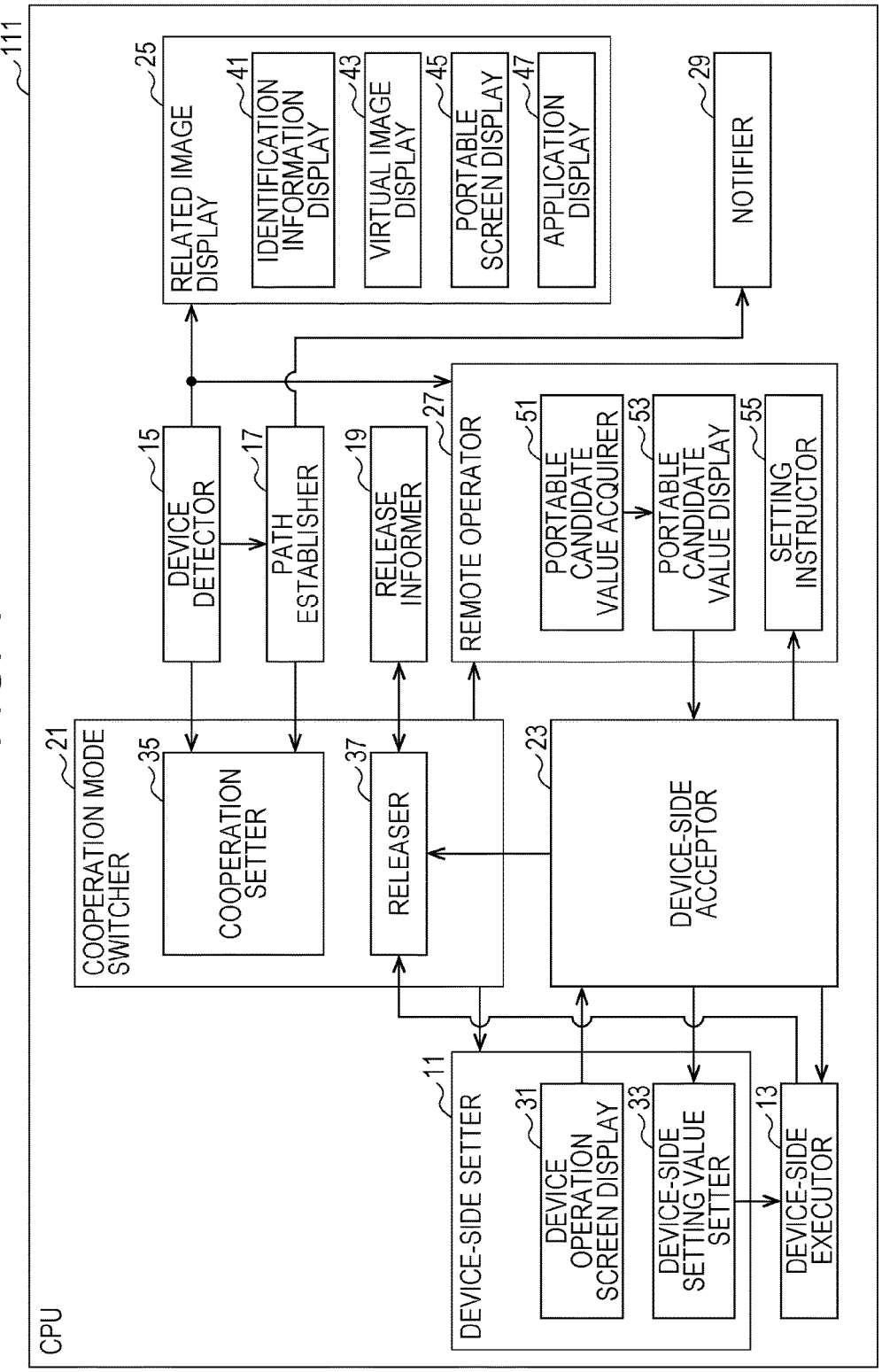
FIG. 4 is a block diagram illustrating an example of functions of a CPU included in the MFP according to one or more embodiments.

FIG. 4 is a block diagram illustrating an example of functions of the CPU included in the MFP according to one or more embodiments. The functions illustrated in FIG. 4 are functions formed in the CPU 111 included in the MFP 100 when the CPU 111 executes cooperative programs stored in the ROM 113, the HDD 115, and the CD-ROM 118.

Referring to FIG. 4, the CPU 111 included in the MFP 100 includes a device-side setter 11, a device-side executor 13, a device detector 15, a path establisher 17, a release informer 19, a cooperation mode switcher 21, a device-side acceptor 23, a related image display 25, a remote operator 27, and a notifier 29.

The device detector 15 controls the touch panel 165 and the short-range communicator 119 to detect a device from among the smartphones 200A, 200B, and 200C when this device is placed on the display surface of the display 161. When a device from among the smartphones 200A, 200B, 200C, for example, the smartphone 200A is placed on the display surface of the display 161, the touch panel 165 detects a position on the display surface of the display 161 where the smartphone 200A is placed. Since the area of the display surface of the display 161 with which the smartphone 200A makes contact is larger than the area of the finger of the user, an upper limit of the area of the finger of the user is defined in advance as a threshold value such that the touch panel 165 judges that the smartphone 200A is placed in a case where the area of a region where the touch panel 165 detects the contact with an object is equal to or larger than the threshold value, while detecting an instruction by the user with the finger in a case where the area of a region where the touch panel 165 detects the contact with an object is smaller than the threshold value.

In response to the touch panel 165 detecting a position where the smartphone 200A is placed, the device detector 15 controls the short-range communicator 119 to transmit a search command for searching for a device present therearound. When receiving the search command, each of the smartphones 200A, 200B, and 200C returns a response command including device identification information for identifying the own device. A network address allocated in the network can be used as the device identification information. The network address is, for example, an Internet protocol address (IP address) or a media access control (MAC) address. When placed on the display surface of the display 161, the smartphone 200A receives the search command and thus returns the response command. Upon receiving the response command returned by the smartphone 200A, the device detector 15 detects that the device placed at a position first detected by the touch panel 165 is the smartphone 200A. When detecting the smartphone 200A, the device detector 15 registers the smartphone 200A as a cooperating device. Specifically, the device detector 15 stores, to the RAM 114, cooperating device information constituted by a pair of the device identification information on the smartphone 200A and position information indicating the position where this smartphone 200A is placed and also outputs a cooperation instruction to the cooperation mode switcher 21 and the path establisher 17. The cooperation instruction includes the device identification information included in the cooperating device information stored in the RAM 114.

When the position specified by the position information paired with the device identification information on the smartphone 200A is no longer detected by the touch panel 165, the device detector 15 judges that the smartphone 200A has left the display surface of the display 161 and deletes the smartphone 200A from the cooperating device. Specifically, the device detector 15 erases the pair of the device identification information and the position information on the smartphone 200A stored in the RAM 114 and also outputs, to the related image display 25 and the remote operator 27, a detachment signal including the device identification information on the smartphone 200A and the position information indicating the position on the display surface of the display 161 on which the smartphone 200A was placed.

Here, when controlling the short-range communicator 119 to transmit the search command in response to the touch panel 165 detecting the position where the smartphone 200A is placed, the device detector 15 receives a response command from the smartphone 200B or 200C in some cases in addition to the response command received from the smartphone 200A. In this case, the device detector 15 excludes, from a processing target, a response command including device identification information included in exclusion device information to be described later, among the plurality of response commands. Additionally, the device detector 15 settles, as a processing target, a response command whose device identification information included therein is not included in any of the cooperating device information stored in the RAM 114 from among the response commands to be treated as processing targets. When one response command is settled as a processing target, the device detector 15 judges that a device specified by the device identification information included in the one response command is placed at a position detected by the touch panel 165.

There is a case where a plurality of response commands is settled by the device detector 15 as processing targets. Examples include a case where another user B is near the MFP 100 while carrying a smartphone 200B but without placing it on the display surface of the display 161. In this case, the device detector 15 controls the display 161 to display, in the vicinity of the position detected by the touch panel 165, an inquiry screen in which a plurality of items of the device identification information individually included in the plurality of response commands can be selected. If the user carrying the smartphone 200A selects the device identification information on the smartphone 200A in accordance with the inquiry screen, the device detector 15 judges that a device placed at a position first detected by the touch panel 165 is the smartphone 200A and also stores, to the RAM 114, the cooperating device information constituted by a pair of the device identification information on the smartphone 200A and the position information indicating a position where this smartphone 200A is placed, while storing unselected device identification information to the RAM 114 as the exclusion device information.

Note that the device detector 15 may authenticate the user before storing the cooperating device information to the RAM 114. For example, authentication information in which user identification information on a user authorized to use the MFP 100 is associated with the device identification information on a device allocated to this user is stored in advance to the HDD 115 and, in a case where the authentication information including the device identification information included in the cooperating device information is stored in the HDD 115, the cooperating device information is stored to the RAM 114. Meanwhile, in a case where the authentication information including the device identification information included in the cooperating device information is not stored in the HDD 115, the device detector 15 does not store the cooperating device information to the RAM 114 but stores the device identification information included in the cooperating device information to the RAM 114 as the exclusion device information. As a result, only the user registered in advance to the MFP 100 can be allowed to use the MFP 100.

The path establisher 17 controls the short-range communicator 119 to negotiate with a device specified by the device identification information included in the cooperation instruction and establishes a communication path. For example, when the smartphone 200A is placed on the display surface of the display 161 by the user A, since the smartphone 200A is detected by the device detector 15, the path establisher 17 establishes a communication path with the smartphone 200A. Upon establishing a communication path with the smartphone 200A, the path establisher 17 outputs a pair of the device identification information on the smartphone 200A and path identification information for identifying the communication path to the cooperation mode switcher 21 and the release informer 19. When the established communication path is disconnected, the path establisher 17 outputs a disconnection signal including the path identification information on the disconnected path to the notifier 29. A case where the communication path is disconnected includes, for example, a case where the smartphone 200A goes out of a communicable range of the short-range communicator 119 and a case where the smartphone 200A disconnects the communication path. Note that the path establisher 17 may control the communication I/F 112 to establish a communication path with the smartphone 200A.

The cooperation mode switcher 21 switches an action mode to either an independent mode or a cooperation mode. The cooperation mode switcher 21 switches the action mode for each of the smartphones 200A, 200B, and 200C. In one or more embodiments, since a plurality of users operates the MFP 100 at the same time, the action mode is switched for each user. The action mode of the MFP 100 is sometimes different depending on the user. Therefore, the cooperation mode switcher 21 settles the action mode corresponding to the device identification information. For example, the cooperation mode switcher 21 switches the action mode for the smartphone 200A to either the cooperation mode for working in cooperation with the smartphone 200A or the independent mode for working independently without cooperating with the smartphone 200A. The cooperation mode switcher 21 outputs the device identification information and an action mode signal indicating one action mode from among the independent mode and the cooperation mode to the device-side setter 11 and the remote operator 27.

The cooperation mode switcher 21 includes a cooperation setter 35 and a releaser 37. The cooperation setter 35 switches the action mode from the independent mode to the cooperation mode, while the releaser 37 switches the action mode from the cooperation mode to the independent mode. In response to the input of a cooperation instruction from the device detector 15 and the input of a pair of the device identification information same as the device identification information included in the cooperation instruction and the path identification information from the path establisher 17, the cooperation setter 35 switches the action mode corresponding to the device identification information from the independent mode to the cooperation mode.

In response to the reception of a cooperation end signal from the smartphone 200A via the communication path with the smartphone 200A established by the path establisher 17, the release informer 19 controls the communication I/F 112 to output a cooperation end instruction to the releaser 37. The cooperation end instruction includes the device identification information on the smartphone 200A that has transmitted the cooperation end signal.

In response to the input of the cooperation end instruction from the release informer 19, the releaser 37 switches the action mode corresponding to the device identification information from the cooperation mode to the independent mode. In addition, there is a case where a cooperation end instruction is input to the releaser 37 from the device-side acceptor 23 or the device-side executor 13, which will be described later. Although the details of the cooperation end instruction output by the device-side acceptor 23 will be described later, for example, in a case where the user A inputs an operation instructing the end of the cooperative processing, the cooperation end instruction is output from the device-side acceptor 23 in response to the acceptance of this operation by the device-side acceptor 23, while includes the device identification information on the smartphone 200A carried by the user A. When the cooperation end instruction is input from the device-side acceptor 23, the releaser 37 switches the action mode corresponding to the device identification information included in the cooperation end instruction from the cooperation mode to the independent mode and also outputs a notification instruction to the release informer 19. The notification instruction includes the device identification information included in the cooperation end instruction.

In response to the input of the notification instruction, the release informer 19 refers to a pair of the device identification information and the path identification information input from the path establisher 17 to specify the path identification information paired with the device identification information included in the cooperation end instruction and controls the communication I/F 112 to transmit the cooperation end signal indicating the end of the cooperative processing to the smartphone 200A via the specified path identification information. As a result, the user A can end cooperation between the MFP 100 and the smartphone 200A by operating the MFP 100 and can confirm with the smartphone 200A that the cooperation has ended.

The device-side executor 13 is capable of executing a plurality of items of processing. The plurality of items of processing that can be executed by the device-side executor 13 includes document reading processing, image formation processing, data transmission and reception processing, facsimile transmission and reception processing, and data management processing. The processing executable by the device-side executor 13 includes processing obtained by combining at least two of the document reading processing, the image formation processing, the data transmission and reception processing, the facsimile transmission and reception processing, and the data management processing. Note that the processing executable by the device-side executor 13 is not limited to these items of processing and may be less or may include more types of processing. Hereinafter, the processing executed by the device-side executor 13 is referred to as device-side processing.

The document reading processing is processing of storing image data obtained by reading a document with the document reader 130 to the RAM 114. Setting values used for executing the document reading processing include a reading surface of the document, whether the document is in color or monochrome, reading resolution, image quality, density, whether to use a stamp or page printing, frame elimination for deleting the periphery of the read image, whether to perform image processing such as sharpening, the file format and name of image data to be stored to the RAM 114, the size of the document, the number of documents, and the type of the document. The type of the document includes whether the documents include a different size and a book document indicating that a plurality of pages are formed.

The image formation processing is processing of causing the image former 140 to form an image of data on a sheet supplied from the paper feeder 150. Setting values used for executing the image formation processing include, for example, whether to use color or monochrome, paper size, type of paper, the number of copies, designation of paper feed tray, whether to perform post-processing, a surface on which an image is formed (one-sided or double-sided), and the orientation of the document. Whether to perform post-processing includes whether to perform sorting, stapling, punching, and so on.

The data transmission and reception processing is processing of receiving data from a computer connected to the network via the communication I/F 112 or processing of transmitting data stored in the HDD 115 or the external storage device 117 to a computer connected to the network via the communication I/F 112. Setting values used for executing the data transmission and reception processing include, for example, data resolution, whether to use color or monochrome, and file format.

The facsimile transmission and reception processing is processing of causing the facsimile 116 to transmit an image of facsimile data or processing of receiving an image of facsimile data from the outside. Setting values used for executing the facsimile transmission and reception processing include, for example, setting of a facsimile line, setting value designating the time of transmission, password, and F code.

The data management processing is processing of storing data to the HDD 115 or the external storage device 117, processing of modifying or deleting data stored in the HDD 115 or the external storage device 117, processing of selecting one or more pieces of data from data stored in the HDD 115 or the external storage device 117 as processing targets. The processing of modifying data includes processing of editing data and processing of changing the format. Setting values used for executing the data management processing are, for example, folder name when a folder is created in the HDD 115, password set for the folder, search character string for searching data, folder type, and the time to delete the document.

The device-side setter 11 includes a device operation screen display 31 and a device-side setting value setter 33. The device operation screen display 31 displays an operation screen on the display 161 for each of the users A, B, and C. The operation screen includes a processing selection screen for selecting one of a plurality of items of processing executable by the device-side executor 13 and a setting value selection screen for setting a setting value used for executing the selected processing.

The device operation screen display 31 displays the processing selection screen within a predetermined range from a position on the display surface of the display 161 where the smartphone 200A is placed. For example, the user A is located near a position on the display surface of the display 161 where the smartphone 200A is placed. The device operation screen display 31 outputs the processing selection screen and the position of the processing selection screen on the display surface of the display 161 to the device-side acceptor 23. When a position detected by the touch panel 165 is located within the processing selection screen after the processing selection screen is input from the device operation screen display 31, the device-side acceptor 23 accepts an operation input by the user A on the processing selection screen. Specifically, the device-side acceptor 23 accepts an operation of selecting the device-side processing based on a position instructed by the user A on the processing selection screen and outputs processing identification information for identifying the device-side processing to the device-side setting value setter 33.

In response to the selection of the device-side processing, the device operation screen display 31 displays the setting value selection screen for setting a setting value used for executing this device-side processing on the display 161 in the vicinity of the processing selection screen. The device operation screen display 31 outputs the setting value selection screen and the position of the setting value selection screen on the display surface of the display 161 to the device-side acceptor 23. When a position detected by the touch panel 165 is located within the setting value selection screen after the setting value selection screen is input from the device operation screen display 31, the device-side acceptor 23 accepts an operation input by the user A on the setting value selection screen. Specifically, the device-side acceptor 23 accepts an operation of selecting a setting value as a device setting value based on a position instructed by the user A on the setting value selection screen and outputs the device setting value to the device-side setting value setter 33.

When accepting an operation instructing the execution of the cooperative processing, the device-side acceptor 23 outputs an execution instruction to the device-side executor 13 and the remote operator 27. For example, the processing selection screen includes a button for instructing the execution of the cooperative processing such that the device-side acceptor 23 accepts an operation instructing the execution of the cooperative processing in a case where a position detected by the touch panel 165 is located within the button for instructing the execution of the cooperative processing.

The device-side setting value setter 33 sets the device-side processing specified by the processing identification information in response to the input of the processing identification information from the device-side acceptor 23 and sets the device-side setting value in response to the input of the device-side setting value from the device-side acceptor 23.

In response to the input of the execution instruction from the device-side acceptor 23, the device-side executor 13 executes the device-side processing set by the device-side setting value setter 33 in accordance with the device-side setting value. For example, when detecting an operation input by the user A instructing the execution of the cooperative processing, the device-side executor 13 executes the device-side processing in cooperation with the smartphone 200A in accordance with the device-side setting value. Specifically, the device-side executor 13 acquires the execution state of the portable-side processing executed by the smartphone 200A from the smartphone 200A and executes the device-side processing in synchronization with the portable-side processing executed by the smartphone 200A. When the device-side processing is to be executed before the portable-side processing, the device-side executor 13 executes the device-side processing after confirming a state of the portable-side processing being executable by the smartphone 200A. Meanwhile, when the device-side processing is to be executed after the portable-side processing, the device-side executor 13 executes the device-side processing after confirming that the portable-side processing has ended in the smartphone 200A. When the device-side executor 13 has ended the execution of the device-side processing, the cooperation end instruction is output to the releaser 37. The cooperation end instruction includes the device identification information on the smartphone 200A carried by the user A.

In response to the input of the detachment signal from the device detector 15, the related image display 25 displays a related image relating to the device identification information included in the detachment signal on the display surface of the display 161 at a position specified by the position information included in the detachment signal. As a result, for example, when the smartphone 200A leaves the display surface of the display 161, the related image relating to the smartphone 200A is displayed at a position where the smartphone 200A was placed and thus, the fact that the user A is operating the MFP 100 can be notified. In addition, when the user A returns near the MFP 100 again, the user A can confirm the own position.

The related image display 25 may include at least one of an identification information display 41, a virtual image display 43, a portable screen display 45, and an application display 47. The identification information display 41 displays an image of the device identification information included in the detachment signal on the display 161 as the related image. The identification information display 41 displays an image of the device identification information included in the detachment signal as the related image on the display surface of the display 161 at a position specified by the position information included in the detachment signal. The virtual image display 43 displays a virtual image imitating the appearance of a device specified by the device identification information included in the detachment signal, here, the smartphone 200A as the related image on the display surface of the display 161 at a position specified by the position information included in the detachment signal.

The portable screen display 45 acquires an image of a screen displayed on a device specified by the device identification information included in the detachment signal, here, the smartphone 200A from the smartphone 200A and displays the acquired image of the screen as the related image on the display surface of the display 161 at a position specified by the position information included in the detachment signal. While the virtual image is displayed by the virtual image display 43, the portable screen display 45 superimposes the image of the screen acquired from the smartphone 200A on a portion equivalent to a display of the smartphone 200A in the virtual image to display.

The smartphone 200A serving as the cooperating device sometimes executes an application program different from the cooperative program for cooperating with the MFP 100 and, when executing such an application program, transmits application identification information for identifying this application program to the MFP 100. When the communication I/F 112 receives the application identification information from a device specified by the device identification information included in the detachment signal, here, the smartphone 200A, the application display 47 judges whether the application program in the received application identification information is a program defined in advance. The program defined in advance is, for example, an application program for calling and an application program for receiving an e-mail. When the application identification information received from the smartphone 200A indicates one of the programs defined in advance, the application display 47 displays an image of this application identification information as the related image on the display surface of the display 161 at a position specified by the position information included in the detachment signal.

The notifier 29 displays a message on the display 161 in response to the input of the detachment signal from the path establisher 17. For example, the notifier 29 displays a message requesting the establishment of the communication path on the display surface of the display 161 at a position specified by the position information included in the detachment signal.

In response to the input of the detachment signal from the device detector 15 while the action mode signal indicating the cooperation mode is input from the cooperation mode switcher 21, the remote operator 27 remotely operates a device specified by the device identification information included in the detachment signal. A case where the detachment signal includes the device identification information on the smartphone 200A will be described here as an example. The remote operator 27 includes a portable candidate value acquirer 51, a portable candidate value display 53, and a setting instructor 55. The portable candidate value acquirer 51 controls the communication I/F 112 to acquire a portable candidate value from the smartphone 200A. The portable candidate value is one or more items of the processing identification information on processing that can be set as the portable-side processing or one or more setting values that can be set as the portable-side setting values on a setting screen displayed at that time point in the smartphone 200A. The portable candidate value acquirer 51 outputs the acquired one or more portable candidate values to the portable candidate value display 53.

The portable candidate value display 53 displays one or more portable candidate values acquired by the portable candidate value acquirer 51 in a selectable manner on the display surface of the display 161 at a position specified by the position information included in the detachment signal. At this time point, since the related image is displayed by the related image display 25 on the display surface of the display 161 at a position specified by the position information included in the detachment signal, the portable candidate value may be displayed so as to be superimposed on the related image or may be displayed around the related image so as not to overlap with the related image. When the portable candidate value is displayed so as not to overlap with the related image, the visibility of the portable candidate value and the related image is improved in a case where the related image includes a character or the like, which is thus effective. When there is a plurality of portable candidate values, all of the plurality of portable candidate values are displayed at a time. Note that, when there is no space for displaying all of the plurality of portable candidate values at a time, the plurality of portable candidate values may be displayed in a scrollable state. Specifically, a predetermined number of portable candidate values are displayed at a time from among a plurality of portable candidate values and, in response to the acceptance of a scroll operation, one or more portable candidate values that were not displayed are displayed at a different time.

The portable candidate value display 53 outputs one or more portable candidate values and the position information indicating respective positions of the one or more portable candidate values on the display surface of the display 161 to the device-side acceptor 23. After the one or more portable candidate values and the position information on each of the one or more portable candidate values are input from the portable candidate value display 53, the device-side acceptor 23 accepts an operation of the user A selecting the one or more portable candidate values in a case where a position detected by the touch panel 165 matches a position specified by the position information on each of the one or more portable candidate values. The device-side acceptor 23 outputs the portable candidate value specified by the accepted operation to the setting instructor 55. In response to the input of the portable candidate value from the device-side acceptor 23, the setting instructor 55 controls the communication I/F 112 to transmit a setting instruction instructing to set the portable candidate value to a device specified by the device identification information included in the detachment signal, here, the smartphone 200A. The setting instruction includes the portable candidate value input from the device-side acceptor 23. As a result, although the details of the smartphone 200A receiving the setting instruction will be described later, the portable-side processing or the portable candidate value is set in accordance with the setting instruction. In addition, there is a case where the setting instructor 55 accepts the input of the execution instruction from the device-side acceptor 23. In response to the input of the execution instruction from the device-side acceptor 23, the setting instructor 55 controls the communication I/F 112 to transmit the execution instruction to the smartphone 200A specified by the device identification information included in the detachment signal. Although the details of the smartphone 200A receiving the execution instruction will be described later, the portable-side processing set up to then is executed in cooperation with the MFP 100 in accordance with the portable candidate value by following the execution instruction.

While one or more of the one or more portable candidate values displayed by the portable candidate value display 53 are being selected, the device-side acceptor 23 can accept an operation input on the operation screen displayed by the device-side setting value setter 33. In addition, while the device-side processing or the device-side setting value is being selected on the operation screen displayed by the device-side setting value setter 33, the device-side acceptor 23 can accept an operation of selecting one or more portable candidate values displayed by the portable candidate value display 53.

The device-side acceptor 23 accepts respective operations corresponding to two different positions by a drag-and-drop operation. The device-side acceptor 23 accepts a drag-and-drop operation based on a position detected by the touch panel 165 on the display surface of the display 161 with the lapse of time. The device-side acceptor 23 accepts an operation continuously instructing the same position on the display surface of the display 161 for a predetermined time as a drag operation. In the drag operation, a position continuously instructed for a predetermined time is specified. The device-side acceptor 23 accepts an operation ending the instruction at a position different from the position of the drag operation after the drag operation as a drop operation. In the drop operation, the last instructed position before the instruction ends is specified. This means that the user moves his/her finger on the display surface of the display 161 from the position specified by the drag operation to the position specified by the drop operation.

Specifically, when accepting the drag operation on one of the one or more portable candidate values displayed by the portable candidate value display 53, the device-side acceptor 23 puts the portable candidate value displayed at a position specified by the drag operation into a selected state and also outputs a setting instruction including the portable candidate value to the setting instructor 55. Then, when a position within the operation screen displayed by the device operation screen display 31 is specified by the drop operation, an operation of selecting the processing identification information or the setting value displayed at the position specified by the drop operation is accepted and the device-side setting value setter 33 is caused to set the device-side processing or the setting value. In this case, while the user is moving his/her finger from the position specified by the drag operation to the position specified by the drop operation on the display surface of the display 161, the portable candidate value selected by the drag operation be displayed at a position instructed by the user such that the portable candidate value is moved and displayed as the user's finger moves.

For example, when data identification information on data stored in the smartphone 200A is specified as the portable candidate value by the drag operation and the processing identification information on the image formation processing is specified by the drop operation during the drag-and-drop operation, the cooperative processing for forming an image of the data stored in the smartphone 200A with the MFP 100 is set.

In addition, when a position within the operation screen displayed by the device operation screen display 31 is specified by the drag operation, the device-side acceptor 23 accepts an operation of selecting the processing identification information or the setting value displayed at the position specified by the drag operation to put the processing identification information or the setting value into a selected state and also causes the device-side setting value setter 33 to set the device-side processing or the setting value. Then, when the position of one of the one or more portable candidate values displayed by the portable candidate value display 53 is specified by the drop operation, the portable candidate value displayed at the position specified by the drop operation is selected and a setting instruction including the portable candidate value is output to the setting instructor 55.

For example, when the processing identification information on the document reading processing is specified by the drag operation and an e-mail address is specified as the portable candidate value by the drop operation during the drag-and-drop operation, the cooperative processing is set in which the smartphone 200A transmits an e-mail addressed to the specified e-mail address, which includes image data obtained by the MFP 100 reading the document.

Figure 5:
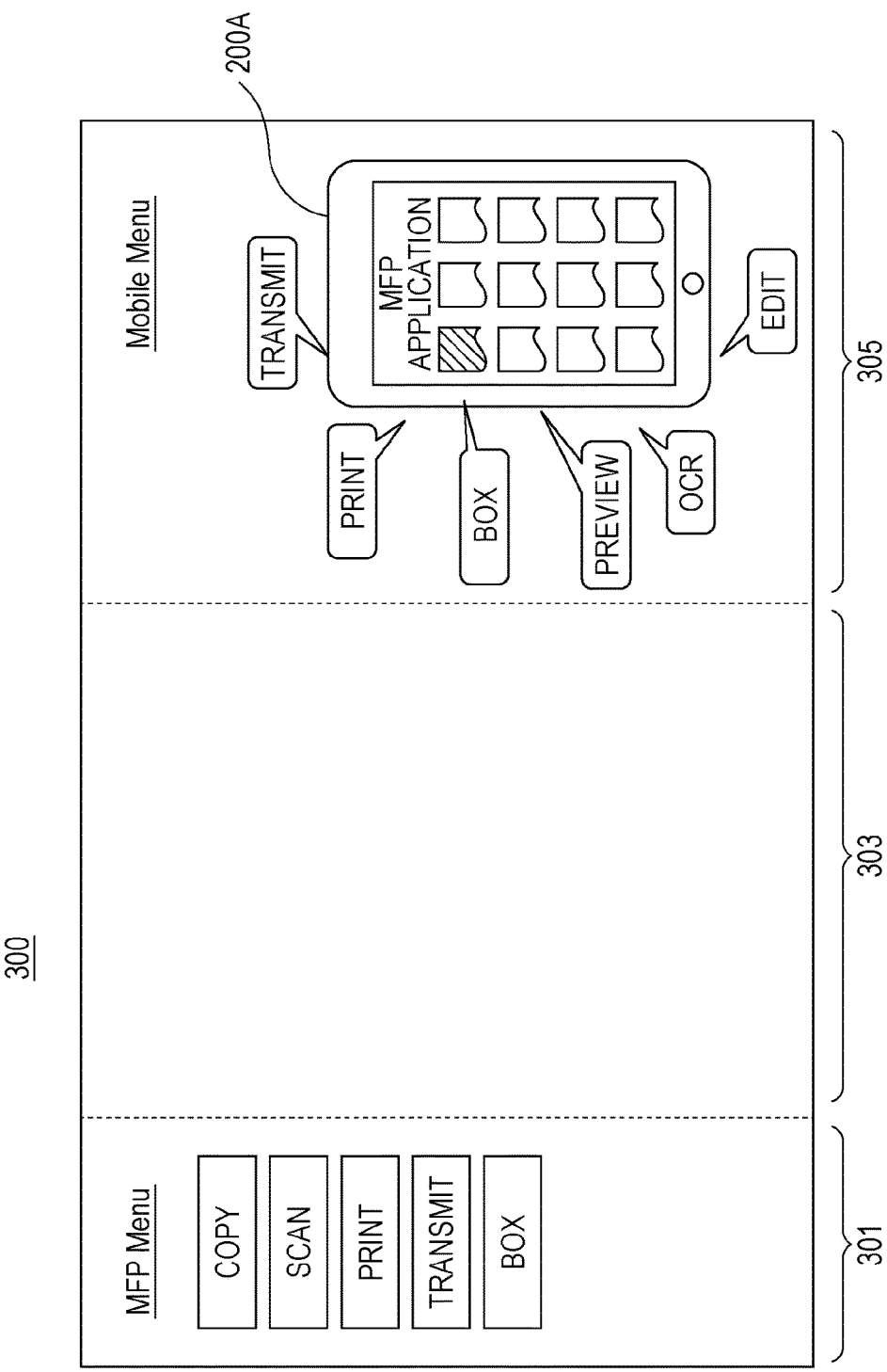
FIG. 5 is a diagram illustrating an example of an operation screen according to one or more embodiments.

FIG. 5 is a diagram illustrating an example of the operation screen according to one or more embodiments. Referring to FIG. 5, an operation screen 300 is displayed in a partial region of the display surface of the display 161 including a position where the smartphone 200A is placed. The operation screen 300 includes an independent region 301 valid in the independent mode, a setting value region 303 in which a setting screen for setting the setting value is displayed, and a cooperation region 305 valid in the cooperation mode. Note that dotted lines in FIG. 5 are provided for distinguishing the independent region 301, the setting value region 303, and the cooperation region 305 and actually do not exist. In order to distinguish the independent region 301, the setting value region 303, and the cooperation region 305, boundary lines may be provided to the operation screen 300, or background colors of the independent region 301, the setting value region 303, and the cooperation region 305 may be made different.

The independent region 301 can accept an operation by the user while the action mode is the independent mode. The independent region 301 includes a plurality of buttons for selecting device independent processing. The plurality of buttons here includes a button for selecting the document reading processing and the image formation processing labeled with characters of "Copy", a button for selecting the document reading processing labeled with characters of "Scan", a button for selecting the data management processing and the image formation processing labeled with characters of "Print", a button for selecting the data transmission and reception processing labeled with characters of "Transmit", and a button for selecting the data management processing labeled with characters of "Box".

The cooperation region 305 can accept an operation by the user while the action mode is the cooperation mode. The cooperation region 305 includes a position where the smartphone 200A is placed and includes a plurality of buttons for selecting the portable-side processing around a region where the smartphone 200A is placed. The plurality of buttons here includes a button for selecting the data transmission and reception processing labeled with characters of "Transmit", a button for selecting the image formation processing labeled with characters of "Print", four buttons for selecting the data management processing individually labeled with characters of "Box", "Preview", "OCR", and "edit".

In the setting value region 303, a setting screen for setting a device independent setting value used for executing the device independent processing selected in the independent region 301 is displayed in the case of the independent mode, while a setting screen for setting the device-side setting value used for executing the device-side processing selected in the cooperation region 305 is displayed in the case of the cooperation mode.

During the independent mode, the user can select the device independent processing and set the device independent setting value by inputting an operation to the independent region 301 and the setting value region 303. Meanwhile, during the cooperation mode, the user can select the device-side processing and set the device-side setting value by inputting an operation to the cooperation region 305 and the setting value region 303 and also can select the portable-side processing and set the portable-side setting value by operating the smartphone 200A.

Figure 6:
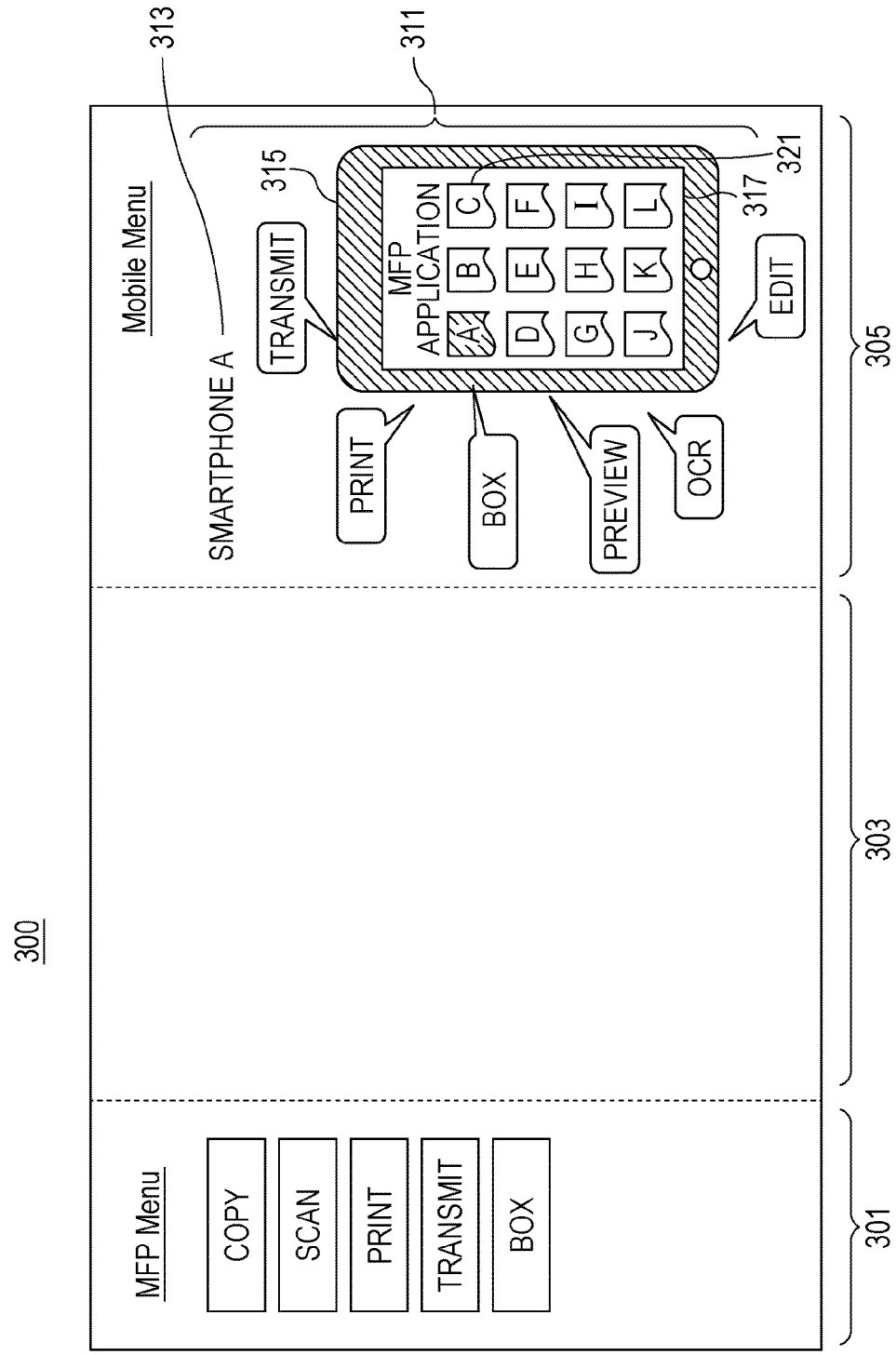
FIG. 6 is a diagram illustrating an example of the operation screen in a state in which a smartphone has been detached according to one or more embodiments.

FIG. 6 is a diagram illustrating an example of the operation screen in a state in which the smartphone has been detached according to one or more embodiments. A difference from FIG. 5 is that a related image 311 and a portable candidate value 321 are included instead of the smartphone 200A. The related image 311 includes an identification information image 313, a virtual image 315, and a screen image 317. The identification information image 313 is an image of a character string of identification information "Smartphone A" on the smartphone 200A. The virtual image 315 is an image imitating the appearance of the smartphone 200A and is equivalent to a hatched portion in FIG. 6. The screen image 317 is an image of a screen displayed on the smartphone 200A. The screen image 317 here is arranged within the virtual image 315 at a position equivalent to a display surface of a display 26 of the smartphone 200A. The screen image indicates an image of a setting screen enumerating file names used for selecting a file.

The portable candidate value 321 is a setting value that can be selected on a setting screen displayed on the smartphone 200A. Since a case where a setting screen for selecting a file is displayed on the smartphone 200A is indicated here as an example, the portable candidate value 321 is illustrated as file names "A" to "L".

In addition, the portable candidate value 321 of the file name "A" is illustrated with hatching provided and indicates a state thereof being selected by the user by the drag operation. For example, if the portable candidate value 321 of the file name "A" is moved until it overlaps with the button for selecting the image formation processing labeled with characters of "Print" and the drop operation is then performed, data having the file name "A" is set as the portable setting value and the image formation processing is set as the device-side processing. In this case, the cooperative processing may be executed as processing of forming an image of the data having the file name "A". In this case, the device setting value can be assigned by a setting value set for the image formation processing at that time point.

Figure 7:
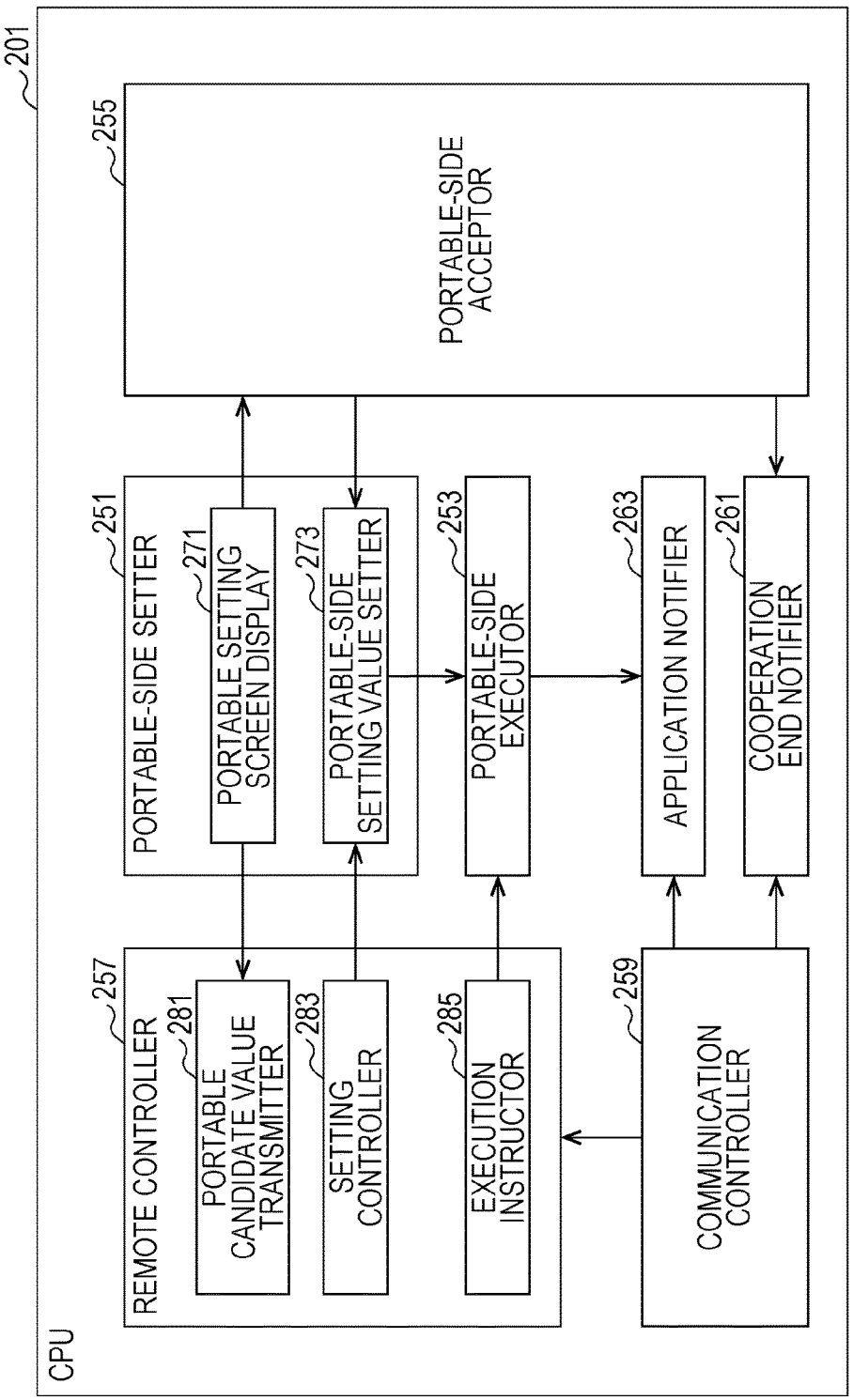
FIG. 7 is a diagram illustrating an example of functions provided in a CPU included in a smartphone according to one or more embodiments.

FIG. 7 is a diagram illustrating an example of functions provided in the CPU included in the smartphone according to one or more embodiments. The functions illustrated in FIG. 7 are functions formed in the CPU 201 included in the smartphone 200A when the CPU 201 executes portable-side cooperative programs stored in the flash memory 203 and the CD-ROM 211A. The portable-side cooperative program is a part of the cooperative program. Hereinafter, a task in which the CPU 201 executes the portable-side cooperative program is referred to as a cooperative task.

Referring to FIG. 7, the CPU 201 includes a portable-side setter 251, a portable-side executor 253, a portable-side acceptor 255, a remote controller 257, a communication controller 259, a cooperation end notifier 261, and an application notifier 263.

The CPU 201 executes a plurality of types of application programs. Description will be made here using as an example a case where the smartphone 200A is installed with at least the portable-side cooperative program, an application program enabling a telephone call, an application program transmitting and receiving an e-mail, and a browsing program for browsing a Web page arranged on the Internet. Note that the application programs installed in the smartphone 200A are not limited to these programs. Hereinafter, a task in which the CPU 201 executes the portable-side cooperative program is referred to as a cooperative task, whereas a task in which the CPU 201 executes an application program other than the portable-side cooperative program is referred to as an application task. The application program other than the portable-side cooperative program here is the application program enabling a telephone call, the application program transmitting and receiving an e-mail, and the browsing program. The portable-side setter 251, the portable-side executor 253, the portable-side acceptor 255, the remote controller 257, the communication controller 259, the cooperation end notifier 261, and the application notifier 263 are the cooperative tasks. The portable-side setter 251 can be the application task.

The portable-side executor 253 can execute a plurality of types of processing. The plurality of types of processing that can be executed by the portable-side executor 253 is settled by application programs installed in the smartphone 200A. When the application task is in a current state, the portable-side executor 253 outputs the application identification information for identifying this application program to the application notifier 263. The application identification information is, for example, the name of the application program. The current state is a state in which an operation by the user input to the operation member 207 can be accepted, whereas a non-current state is a state in which an operation by the user input to the operation member 207 cannot be accepted.

The portable-side setter 251 includes a portable setting screen display 271 and a portable-side setting value setter 273. The portable setting screen display 271 displays a setting screen on the display 206. The portable-side setter 251 outputs the setting screen displayed on the display 206 to the portable-side acceptor 255. The setting screen includes a processing selection screen for selecting one of a plurality of types of processing executable by the portable-side executor 253 and a setting value selection screen for setting a setting value used for executing the selected processing.

When a position detected by the touch panel 207B is located within the setting screen after the setting screen is input from the portable setting screen display 271, the portable-side acceptor 255 accepts an operation input by the user A to the setting screen. Specifically, the portable-side acceptor 255 accepts an operation of selecting the portable-side setting value based on a position instructed by the user A on the setting value selection screen and outputs the portable-side setting value to the portable-side setting value setter 273.

There is a case where the portable-side acceptor 255 accepts an operation instructing the end of the cooperative processing. For example, the processing selection screen includes a button for instructing the end of the cooperative processing such that the portable-side acceptor 255 accepts an operation instructing the end of the cooperative processing in a case where a position detected by the touch panel 207B is located within the button for instructing the end of the cooperative processing. When accepting an operation instructing the end of the cooperative processing, the portable-side acceptor 255 outputs the cooperation end instruction to the cooperation end notifier 261.

The portable-side setting value setter 273 sets the portable-side processing specified by the processing identification information in response to the input of the processing identification information from the portable-side acceptor 255 and sets a setting value as the portable-side setting value in response to the input of this setting value from the portable-side acceptor 255. The portable-side setting value setter 273 outputs a pair of the processing identification information for identifying the set portable-side processing and the portable-side setting value to the portable-side executor 253.

The communication controller 259 controls the short-range communicator 209 to return a response command including the device identification information on the own device in response to the reception of the search command from the MFP 100. Additionally, the communication controller 259 controls the short-range communicator 209 to negotiate with the MFP 100 in response to the reception of a connection request from the MFP 100 and establishes a communication path. The communication controller 259 outputs the device identification information on the MFP 100 and the path identification information for identifying the communication path established with the MFP 100 to the remote controller 257, the application notifier 263, and the cooperation end notifier 261. In one or more embodiments, since the MFP 100 transmits the connection request to establish a communication path when the user A places the smartphone 200A on the display surface of the display 161 of the MFP 100, the communication controller 259 establishes a communication path once the user A places the smartphone 200A on the display surface of the display 161 of the MFP 100. Note that the communication controller 259 may control the wireless LAN I/F 208 to establish a communication path with the MFP 100 in response to the reception of the connection request from the MFP 100.

The remote controller 257 includes a portable candidate value transmitter 281, a setting controller 283, and an execution instructor 285. A setting screen is input to the portable candidate value transmitter 281 from the portable setting screen display 271. The portable candidate value transmitter 281 specifies one or more candidate values defined on the setting screen. The candidate value is a setting value that can be set on the setting screen and includes the processing identification information on processing that can be set as the portable-side processing and the setting value that can be set as the portable-side setting value. The portable candidate value transmitter 281 controls the short-range communicator 209 to transmit the specified one or more candidate values to the MFP 100 via the communication path established by the communication controller 259 with the MFP 100.

The setting controller 283 controls the short-range communicator 209 to receive the setting instruction from the MFP 100 via the communication path with the MFP 100 established by the communication controller 259. The setting instruction is transmitted to the MFP 100 by the portable candidate value transmitter 281 and includes one of one or more portable candidate values to indicate an instruction to set the one of one or more portable candidate values as the portable-side processing or the portable setting value. In response to the input of the setting instruction, the setting controller 283 instructs the portable-side setting value setter 273 to set the portable candidate value included in the setting instruction. When setting of the portable candidate value is instructed by the setting controller 283, the portable-side setting value setter 273 sets processing specified by the processing identification information as the portable-side processing in a case where the portable candidate value is the processing identification information and sets the setting value as the portable setting value in a case where the portable candidate value is the setting value.

The execution instructor 285 controls the short-range communicator 209 to receive the execution instruction from the MFP 100 via the communication path with the MFP 100 established by the communication controller 259. The execution instruction indicates an instruction to execute the cooperative processing. In response to the reception of the execution instruction from the MFP 100, the execution instructor 285 instructs the portable-side executor 253 to execute the portable-side processing.

In response to the instruction from the execution instructor 285 to execute the portable-side processing, the portable-side executor 253 executes the portable-side processing set by the portable-side setting value setter 273 in accordance with the portable-side setting value. Specifically, the portable-side executor 253 executes the portable-side processing in synchronization with the MFP 100. For example, the portable-side executor 253 acquires an execution state of the device-side processing executed by the MFP 100 from the MFP 100 to execute the portable-side processing. When the portable-side processing is to be executed before the device-side processing, the portable-side processing is executed after a state of the device-side processing being executable by the MFP 100 is confirmed. When the portable-side processing is to be executed after the device-side processing, the portable-side processing is executed after the fact that the device-side processing has been ended by the MFP 100 is confirmed.

Figure 8:
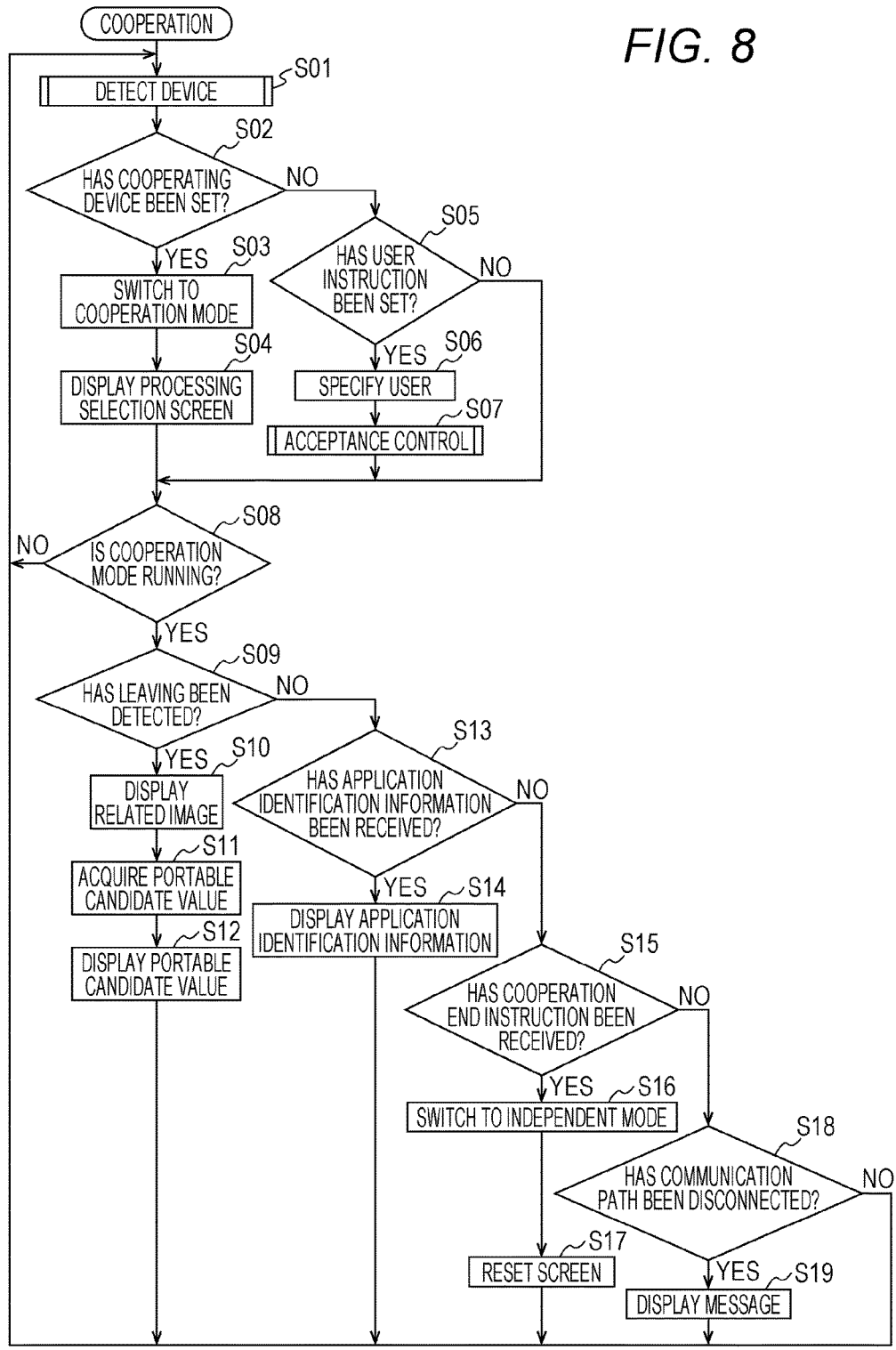
FIG. 8 is a flowchart illustrating an example of a flow of cooperative processing according to one or more embodiments.

FIG. 8 is a flowchart illustrating an example of a flow of the cooperative processing according to one or more embodiments. The cooperative processing is processing executed by the CPU 111 included in the MFP 100 when the CPU 111 executes the cooperative programs stored in the ROM 113, the HDD 115, and the CD-ROM 118. Referring to FIG. 8, the CPU 111 executes device detection processing (step S01) and advances the processing to step S04.

Figure 9:
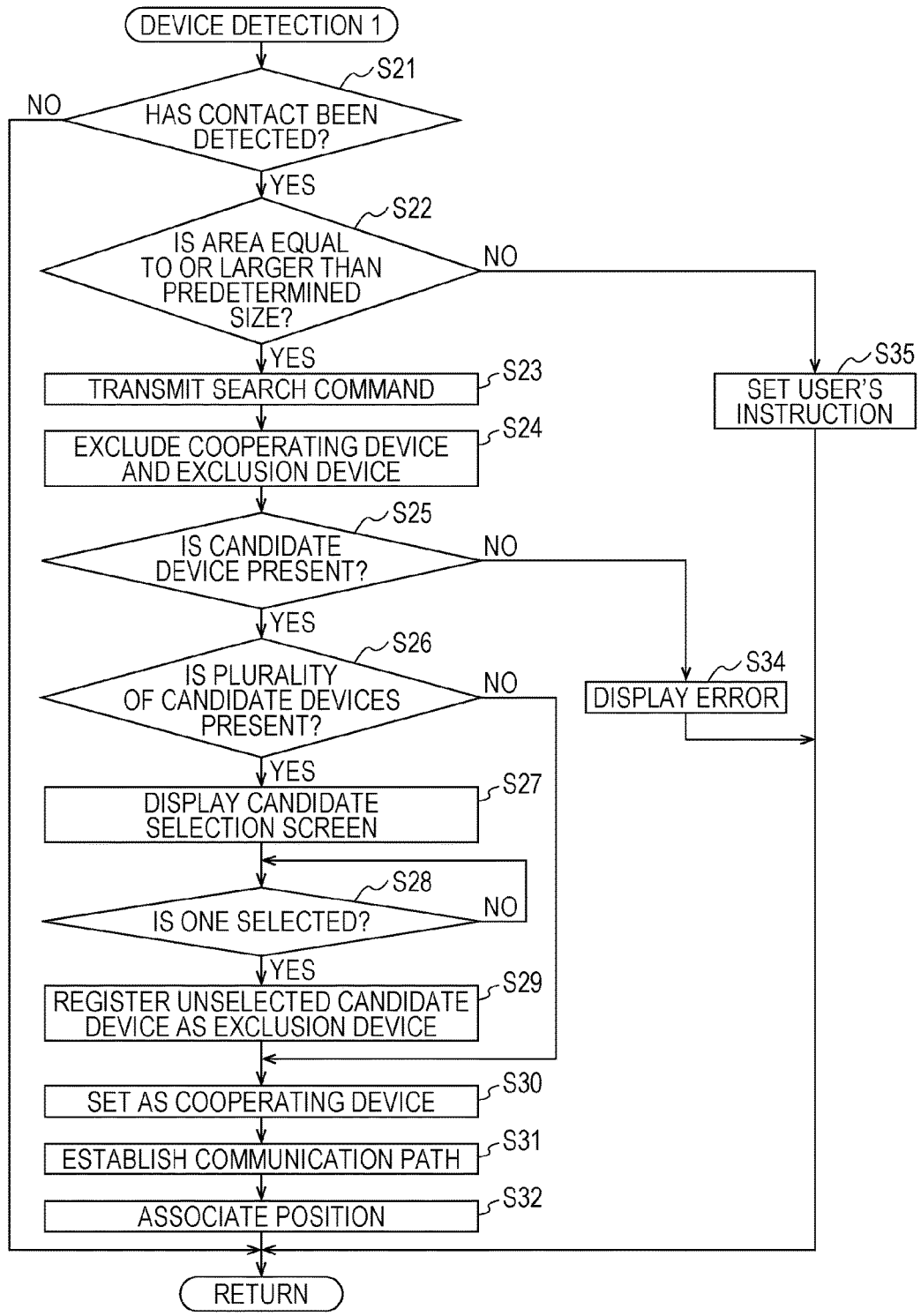
FIG. 9 is a flowchart illustrating an example of a flow of device detection processing according to one or more embodiments.

FIG. 9 is a flowchart illustrating an example of a flow of the device detection processing according to one or more embodiments. Referring to FIG. 9, the CPU 111 judges whether an object has made contact with the display surface of the display 161 (step S21). Specifically, when the touch panel 165 is controlled and the touch panel 165 detects a position with which the object has made contact, it is judged that the object has made contact with the display surface of the display 161. The processing is advanced to step S22 if the touch panel 165 has detected a position with which the object has made contact. Otherwise, the processing is returned to the cooperative processing.

In next step S22, it is judged whether the area of a region where the object is in contact with the display surface of the display 161 is equal to or larger than a predetermined size. The predetermined size is the upper limit of the area of the user's finger. This is for distinguishing between an instruction by a finger of a person and an instruction by the smartphone 200A being laid down. The processing is advanced to step S23 if the area of the region where the object has made contact with the display surface of the display 161 is equal to or larger than the predetermined size. Otherwise, the processing is advanced to step S35. In step S35, the user's instruction is set and the processing is returned to the cooperative processing.

In step S23, the short-range communicator 119 is controlled to transmit the search command. In response to the reception of the search command, one or more of the smartphones 200A, 200B, and 200C that are present in a range communicable with the short-range communicator 119 individually return the response commands including the device identification information on the own devices. There is a case where, in addition to a device placed on the display surface of the display 161 but not registered in the cooperating device from among the smartphones 200A, 200B, and 200C, a device not placed on the display surface of the display 161 or a device placed on the display surface of the display 161 and already registered in the cooperating device returns the response command. Hereinafter, a device that returns the response command is referred to as a candidate device. Therefore, in next step S24, the cooperating device and an exclusion device are excluded from the candidate devices. The exclusion device is a device to be registered as the exclusion device in step S29 to be described later. The cooperating device is a device to be registered as the cooperating device in step S30 to be described later. In next step S25, it is judged whether a candidate device is present. The processing is advanced to step S26 if a candidate device is present. Otherwise, the processing is advanced to step S34. In step S34, an error message is displayed on the display 161 and the processing is returned to the cooperative processing.

In next step S26, it is judged whether a plurality of candidate devices is present. The processing is advanced to step S27 if a plurality of candidate devices is present. Otherwise, the processing is advanced to step S30. In step S30, one candidate device is set as the cooperating device when the processing has proceeded from step S26 and the processing is advanced to step S31.

A case where the processing proceeds to step S27 is a case where a plurality of candidate devices is present. In step S27, a candidate selection screen for selecting one of the plurality of candidate devices is displayed on the display 161 and the processing is advanced to step S28. A position where the candidate selection screen is displayed is in the vicinity of the position detected by the touch panel 165 in step S01 in FIG. 8. In step S28, a standby state is kept until one of the plurality of candidate devices is selected (NO in step S28). If one candidate device is selected (YES in step S28), the processing is advanced to step S29. In step S29, all of one or more candidate devices not selected from among the plurality of candidate devices are registered as the exclusion devices and the processing is advanced to step S30.

In step S30, when the processing has proceeded from step S29, the candidate device selected in step S28 is set as the cooperating device and the processing is advanced to step S31. In step S31, the short-range communicator 119 is controlled to establish a communication path with the candidate device set as the cooperating device in step S30 and the processing is advanced to step S32.

In step S32, the position detected by the touch panel 165 in step S21 is associated with the device set as the cooperating device in step S30 and the processing is returned to the cooperative processing. Specifically, the device identification information on the cooperating device and the position information indicating the position detected by the touch panel 165 are associated with each other and stored to the RAM 114.

Returning to FIG. 8, after the device detection processing is executed in step S01, it is judged in step S02 whether the cooperating device has been set. The processing is advanced to step S03 if the cooperating device has been set by the device detection processing. Otherwise, the processing is advanced to step S05.

In step S03, the action mode is switched to the cooperation mode and the processing is advanced to step S04. In step S04, the processing selection screen is displayed on the display 161 and the processing is advanced to step S08. The processing selection screen is a screen for selecting the device-side processing from a plurality of items of the processing executable by the MFP 100. The processing selection screen is displayed in the vicinity of the position detected by the touch panel 165 in step S01.

Hereinafter, description will be made using as an example a case where the smartphone 200A is set as the cooperating device by the device detection processing executed in step S01 when the user A places the smartphone 200A on the display surface of the display 161. In this case, the device identification information on the smartphone 200A and position identification information indicating a position on the display surface of the display 161 where the smartphone 200A is placed are temporarily stored to the RAM 114.

In step S05, it is judged whether a user's instruction has been set by the device detection processing executed in step S01. The processing is advanced to step S06 if the user's instruction has been set. Otherwise, the processing is advanced to step S08.

A case where the processing proceeds to step S06 is a case where the user gives an instruction to the touch panel 165 with a finger. In step S06, the user who has given an instruction to the touch panel 165 is specified. When the cooperating device is set in step S01, since the device identification information and the position information on the cooperating device are stored in the RAM 114, the user is specified using the above device identification information and position information on the cooperating device. For example, when the smartphone 200A is registered as the cooperating device, a section within a predetermined range from a position on the display surface of the display 161 where the smartphone 200A is placed is settled as a work area of the user A who carries the smartphone 200A. When the position detected on the touch panel 165 is included in the work area of the user A, the user who has given an instruction to the touch panel 165 is specified as the user A.

In next step S07, acceptance control processing is executed and the processing is advanced to step S08. Although the details of the acceptance control processing will be described later, the acceptance control processing is processing of settling an operation by the user A based on the position detected by the touch panel 165 and executing processing defined by the settled operation.

In step S08, it is judged whether the action mode is the cooperation mode. The processing is advanced to step S09 if the action mode is the cooperation mode. Otherwise, the processing is returned to step S01. In step S09, it is detected whether the cooperating device has left the display surface of the display 161. Since the smartphone 200A is registered as the cooperating device, the device identification information and the position information on the smartphone 200A are stored in the RAM 114. When the touch panel 165 no longer detects the contact of an object at the position specified by the position information associated with the smartphone 200A, it is judged that the smartphone 200A has left the display surface of the display 161. The processing is advanced to step S10 if it is detected that the smartphone 200A serving as the cooperating device has left the display surface of the display 161. Otherwise, the processing is advanced to step S13.

In step S10, the related image is displayed at the position on the display surface of the display 161 specified by the position information associated with the smartphone 200A and the processing is advanced to step S11. The related image is device identification information for identifying the smartphone 200A serving as the cooperating device. Alternatively, the related image may be a virtual image imitating the appearance of the smartphone 200A serving as the cooperating device. Additionally, when an image of the setting screen displayed on the smartphone 200A at that time point is acquired from the smartphone 200A serving as the cooperating device, the acquired image of the setting screen may be used as the related image.

In step S11, the portable candidate value is acquired and the processing is advanced to step S12. The short-range communicator 119 is controlled to acquire the portable candidate value from the smartphone 200A serving as the cooperating device. The portable candidate value is processing identification information for identifying processing selectable on the setting screen displayed by the smartphone or a setting value selectable on the setting screen.

In next step S12, the portable candidate value acquired in step S11 is displayed on the display 161 and the processing is returned to step S01. The portable candidate value is displayed at a position defined in advance on the basis of the position on the display surface of the display 161 specified by the position information associated with the smartphone 200A. The related image is already displayed in step S10 at the position on the display surface of the display 161 specified by the position information associated with the smartphone 200A. The portable candidate value may be superimposed on the related image when displayed or, in a case where the related image includes alphanumeric characters, may be displayed around the related image so as not to overlap with the related image. When there is a plurality of portable candidate values, all of the plurality of portable candidate values are displayed at a time. Note that, when there is no space for displaying all of the plurality of portable candidate values at a time, the plurality of portable candidate values may be displayed in a scrollable state.

In step S13, it is judged whether the short-range communicator 119 has received the application identification information from the smartphone 200A serving as the cooperating device. The processing is advanced to step S14 if the application identification information has been received. Otherwise, the processing is advanced to step S15. In step S14, an image of the application identification information is displayed as a related image at a position defined in advance on the basis of the position on the display surface of the display 161 specified by the position information associated with the smartphone 200A and the processing is returned to step S01. Since a related image different from the image of the application identification information is already displayed in step S10, the image of the application identification information is displayed around the related image displayed in step S10 so as not to overlap with the related image.

In step S15, it is judged whether the short-range communicator 119 has received the cooperation end instruction from the smartphone 200A serving as the cooperating device. The processing is advanced to step S16 if the cooperation end instruction has been received. Otherwise, the processing is advanced to step S18. In step S16, the action mode is switched to the independent mode and the processing is advanced to step S17. In step S17, the screen displayed on the display 161 is reset and the processing is returned to step S01. Specifically, the display of the processing selection screen displayed in step S04, the related image displayed in step S10, the portable candidate value displayed in step S12, and the application identification information displayed in step S14 is ended.

In step S18, it is judged whether the communication path established with the smartphone 200A serving as the cooperating device has been disconnected. When the short-range communicator 119 no longer receives a response from the smartphone 200A, it is judged that the communication path has been disconnected. The processing is advanced to step S19 if it is judged that the communication path has been disconnected. Otherwise, the processing is returned to step S01. In step S19, a message is displayed. For example, a message requesting the establishment of a communication path is displayed at a position defined in advance on the basis of the position on the display surface of the display 161 specified by the position information associated with the smartphone 200A. Specifically, the message is displayed around the position specified by the position information associated with the smartphone 200A in a region not overlapping with the already displayed image. The message is, for example, a message requesting the user to establish a communication path.

Figure 10:
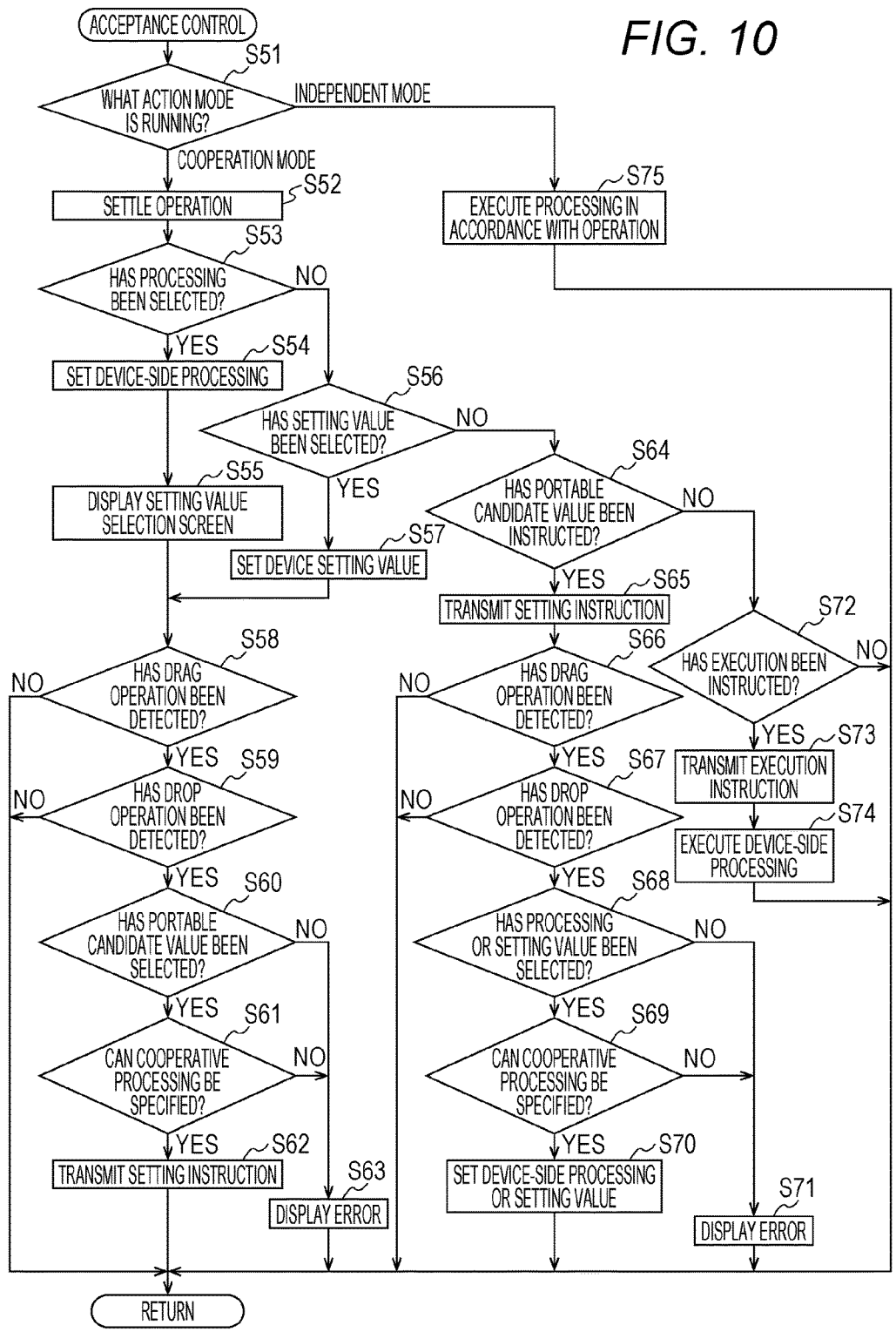
FIG. 10 is a flowchart illustrating an example of a flow of acceptance control processing according to one or more embodiments.

FIG. 10 is a flowchart illustrating an example of a flow of the acceptance control processing according to one or more embodiments. The acceptance control processing is processing executed in step S07 in FIG. 8. The position instructed by the user A is detected by the touch panel 165 at the stage before the acceptance control processing is executed. Referring to FIG. 10, the CPU 111 branches the processing depending on the action mode (step S51). The processing is advanced to step S52 if the action mode is the cooperation mode. The processing is advanced to step S75 if the action mode is the independent mode. In step S75, an operation defined in the independent mode is specified based on the position detected by the touch panel 165 and processing is executed in accordance with the specified operation. Then, the processing is returned to the cooperative processing.

In step S52, an operation is settled based on the position detected by the touch panel 165. Based on the position detected by the touch panel 165 while the processing selection screen, the setting value selection screen, or an image of the portable candidate value is displayed on the display 161, a position within the processing selection screen, the setting value selection screen, or the image of the portable candidate value is specified and an operation is settled. The processing selection screen includes a plurality of buttons to which a plurality of items of processing executable by the MFP 100 are individually allocated and a button to which an operation instructing the execution of the cooperative processing is allocated. When the position detected by the touch panel 165 is located within a button to which processing is allocated, an operation of selecting the processing allocated to this button is settled. When the position detected by the touch panel 165 is located within a button to which the operation instructing the execution of the cooperative processing is allocated, the operation instructing the execution of the cooperative processing is settled.

The setting value selection screen includes a plurality of buttons to which setting values are allocated. When the position detected by the touch panel 165 is located within a button to which a setting value is allocated, an operation of selecting the setting value allocated to this button is settled. Note that, when the setting value selection screen includes a keyboard containing a plurality of keys and the position detected by the touch panel 165 is located within a key, an operation of selecting an alphanumeric character allocated to this key as a portable setting value may be settled.

In addition, when the position detected by the touch panel 165 is located within one of one or more portable setting values, an operation instructing the portable setting value including the position detected by the touch panel 165 is settled.

In step S53, it is judged whether the operation settled in step S52 is an operation of selecting processing. The processing is advanced to step S54 if the operation of selecting processing has been settled. Otherwise, the processing is advanced to step S56. In step S54, the selected processing is set as the device-side processing and the processing is advanced to step S55. In step S55, a setting value setting screen for setting a setting value used for executing the device-side processing is displayed on the display 161 and the processing is advanced to step S58.

In step S56, it is judged whether the operation settled in step S52 is an operation of selecting a setting value. The processing is advanced to step S57 if the operation of selecting a setting value has been settled. Otherwise, the processing is advanced to step S64. A case where the processing proceeds to step S57 is a case where the position detected by the touch panel 165 is located within a button to which a setting value included in the setting value selection screen displayed in step S55 is allocated. In this case, an operation of selecting a setting value allocated to that button is settled. In step S57, the selected setting value is set as the device setting value and the processing is advanced to step S58.

In step S58, it is judged whether a drag operation has been detected. When the touch panel 165 continues to detect the same position for a predetermined time or longer, a drag operation is detected. When the processing has proceeded from step S55, the drag operation is detected in a case where a position within a button allocated to the device-side processing on the processing selection screen is continuously detected by the touch panel 165 for a predetermined time or longer. When the processing has proceeded from step S57, the drag operation is detected in a case where a position within a button allocated to the device setting value on the setting value selection screen is continuously detected by the touch panel 165 for a predetermined time or longer. The processing is advanced to step S59 if a drag operation has been detected. Otherwise, the processing is returned to the cooperative processing.

In step S59, it is judged whether a drop operation has been detected. A drop operation is detected when the last detected position is different from a position where the drag operation was detected at a time point when a position instructed by the finger is no longer detected by the touch panel 165 after the drag operation is detected. The position last detected by the touch panel 165 is specified by the drop operation and an operation is settled based on the specified position. The processing is advanced to step S60 if a drop operation has been detected. Otherwise, the processing is returned to the cooperative processing.

In step S60, it is judged whether an operation of selecting the portable candidate value has been settled by the drop operation. If the position specified by the drop operation is located within one of images of one or more portable candidate values, an operation of selecting the corresponding portable candidate value is specified. The processing is advanced to step S61 if an operation of selecting the portable candidate value has been settled by the drop operation. Otherwise, the processing is advanced to step S63. In step S61, it is judged whether the cooperative processing can be specified. Whether the cooperative processing can be executed is judged depending on the device-side processing set in step S54 and the device setting value set in step S57 and the portable candidate value selected in step S60. When a combination of the device-side processing, the device setting value, and the portable candidate value is not prohibited in advance, it is judged that the cooperative processing can be specified. The processing is advanced to step S62 if the cooperative processing can be specified. Otherwise, the processing is advanced to step S63. In step S62, the short-range communicator 119 is controlled to transmit the setting instruction to the smartphone 200A serving as the cooperating device and the processing is returned to the cooperative processing. The setting instruction is a command instructing the setting of the portable candidate value set in step S60 and includes the portable candidate value set in step S60. In step S63, an error message is displayed on the display 161 and the processing is returned to the cooperative processing. The error message is a message notifying that the drag operation and the drop operation are inappropriate.

In step S64, it is judged whether the operation settled in step S52 is an operation instructing the portable candidate value. The processing is advanced to step S65 if the operation instructing the portable candidate value has been settled. Otherwise, the processing is advanced to step S72. In step S65, the short-range communicator 119 is controlled to transmit the setting instruction to the smartphone 200A serving as the cooperating device and the processing is advanced to step S66. The setting instruction includes the portable candidate value specified by the operation settled in step S52.

In step S66, it is judged whether a drag operation has been detected. Here, when the touch panel 165 continues to detect a position within an image of the portable candidate value for a predetermined time or longer, a drag operation is detected. The processing is advanced to step S67 if a drag operation has been detected. Otherwise, the processing is returned to the cooperative processing.

In step S67, it is judged whether a drop operation has been detected. The processing is advanced to step S68 if a drop operation has been detected. Otherwise, the processing is returned to the cooperative processing. In step S68, it is judged whether an operation of selecting processing or an operation of selecting a setting value has been settled by the drop operation. The processing is advanced to step S69 if an operation of selecting processing or an operation of selecting a setting value has been settled by a drop operation. Otherwise, the processing is advanced to step S71. In step S68, it is judged whether the cooperative processing can be specified. Whether the cooperative processing can be executed is judged depending on the portable candidate value included in the setting instruction transmitted in step S66 and the processing or the setting value selected by the drop operation. When a combination of the portable candidate value and the processing or the setting value selected by the drop operation is not prohibited in advance, it is judged that the cooperative processing can be specified. The processing is advanced to step S70 if the cooperative processing can be specified. Otherwise, the processing is advanced to step S71. In step S70, the processing or the setting value selected by the drop operation is set and the processing is returned to the cooperative processing. Specifically, when processing is selected by the drop operation, the selected processing is set as the device-side processing and, when a setting value is selected by the drop operation, the selected setting value is set as the device setting value. In step S71, an error message is displayed on the display 161 and the processing is returned to the cooperative processing. The error message is a message notifying that the drag operation and the drop operation are inappropriate.

In step S72, it is judged whether the operation settled in step S52 is an execution instruction operation instructing the execution of the cooperative processing. The processing is advanced to step S73 if the operation is an execution instruction operation. Otherwise, the processing is returned to the cooperative processing. In step S73, the short-range communicator 119 is controlled to transmit the execution instruction to the smartphone 200A serving as the cooperating device and the processing is advanced to step S74. In step S74, the device-side processing is executed in cooperation with the smartphone 200A serving as the cooperating device in accordance with the device-side setting value and the processing is returned to the cooperative processing.

Note that, when the cooperative processing specified in step S61 or the cooperative processing specified in step S69 can be executed, the processing may be advanced to step S73 such that the cooperative processing is executed immediately after the drop operation.

Figure 11:
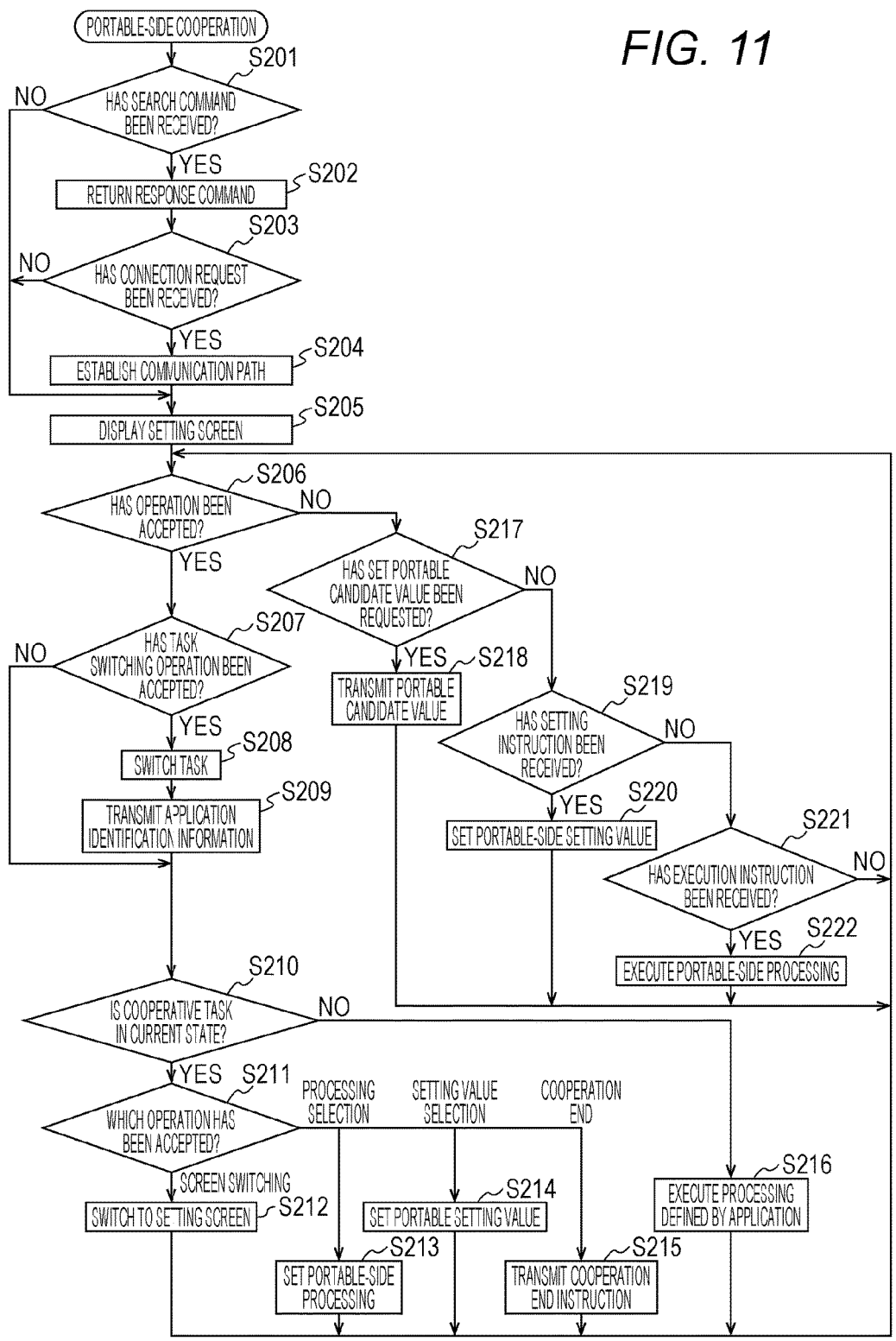
FIG. 11 is a flowchart illustrating an example of a flow of portable-side cooperative processing according to one or more embodiments.

FIG. 11 is a flowchart illustrating an example of a flow of portable-side cooperative processing according to one or more embodiments. The portable-side cooperative processing is processing executed by the CPU 201 included in the smartphone 200A when the CPU 201 executes the portable-side cooperative programs stored in the flash memory 203 and the CD-ROM 211A. Referring to FIG. 11, it is judged whether the short-range communicator 209 has received a search command. The processing is advanced to step S202 if the search command has been received. Otherwise, the processing is advanced to step S205. A case where the search command transmitted by the MFP 100 is received will be described here as an example.

In step S202, the short-range communicator 209 is controlled to return a response command. Then, it is judged whether the short-range communicator 209 has received a connection request from the MFP 100 that has transmitted the search command received in step S201 (step S203). The processing is advanced to step S204 if the connection request has been received. Otherwise, the processing is advanced to step S205. In step S204, a communication path is established with the MFP 100 that has transmitted the connection request and the processing is advanced to step S205.

In step S205, the setting screen is displayed on the display 206 and the processing is advanced to step S206. In step S206, it is judged whether an operation has been accepted. A position on the setting screen is specified based on the position detected by the touch panel 207B and an operation is settled. When the operation is settled, it is judged that the operation has been accepted. The processing is advanced to step S207 if the operation has been accepted. Otherwise, the processing is advanced to step S217. When the setting screen includes a button to which an operation is allocated and a position in this button is specified, the operation allocated to the button is settled. For example, when the setting screen includes a plurality of processing selection buttons to which a plurality of items of processing is individually allocated and a position in one of the plurality of processing selection buttons is specified, a processing selection operation of selecting processing allocated to this processing selection button is settled. When the setting screen includes a plurality of setting value selection buttons to which a plurality of setting values is individually allocated and a position in one of the plurality of setting value selection buttons is specified, a setting value selection operation of selecting a setting value allocated to this setting value selection button is settled. In addition, in a case where the setting screen includes a keyboard containing a plurality of keys, when a position in one of the plurality of keys is specified, an operation of inputting an alphanumeric character allocated to this key as a setting value is settled. Furthermore, when the operation screen includes a cooperation end key to which a cooperation end operation instructing the end of the cooperative processing is allocated and a position in the cooperation end key is specified, the cooperation end operation is settled. When the operation screen includes a screen switching key for switching to another operation screen and a position in the screen switching key is specified, a screen switching operation is settled.

Meanwhile, there is a case where, when an application task that executes an application program different from the cooperative program is activated, a task switching key to which an operation of switching a task to this application task is allocated is displayed on the operation screen. Examples thereof include a case where an application task that executes an application program for calling is activated in response to an incoming call and a case where an application task that executes an application program for transmitting and receiving e-mails is activated in response to the reception of an e-mail. When a position in the task switching key is specified, a task switching operation is settled.

In step S207, it is judged whether the operation accepted in step S206 is the task switching operation. The processing is advanced to step S208 if the task switching operation has been accepted. Otherwise, the processing is advanced to step S210. In step S208, a task specified by the task switching key is switched to the current state and the processing is advanced to step S209.

In step S209, the short-range communicator 209 is controlled to transmit the application identification information on an application program corresponding to the task in the current state to the MFP 100 and the processing is advanced to step S210.

In step S210, it is judged whether the cooperative task is in the current state. The processing is advanced to step S211 if the cooperative task is in the current state. Otherwise, the processing is advanced to step S216. In step S216, processing defined by the application task in the current state is executed and the processing is returned to step S206.

In step S211, the processing is branched depending on the operation accepted in step S206. If the screen switching operation has been accepted, the processing is advanced to step S212. If the processing selection operation has been accepted, the processing is advanced to step S213. If the setting value selection operation has been accepted, the processing is advanced to step S214. If the cooperation end operation has been accepted, the processing is advanced to step S215.

In step S212, the screen displayed on the display 206 is switched to the setting screen specified by the screen switching operation and the processing is returned to step S206. In step S213, the processing selected by the processing selection operation is set as the portable-side processing and the processing is returned to step S206. In step S214, the setting value selected by the setting value selection operation is set as the portable setting value and the processing is returned to step S206. In step S215, the short-range communicator 209 is controlled to transmit the cooperation end instruction to the MFP 100 and the processing is returned to step S206.

In step S217, it is judged whether the portable candidate value has been requested by the MFP 100. Specifically, when the short-range communicator 209 receives a signal requesting the transmission of the portable candidate value from the MFP 100, it is judged that the portable candidate value has been requested. The processing is advanced to step S218 if the portable candidate value has been requested. Otherwise, the processing is advanced to step S219. In step S218, the portable candidate value is transmitted and the processing is returned to step S206. The portable candidate value includes the processing identification information on each of one or more items of processing selectable on the setting screen displayed on the display 206 at a time point when the portable candidate value is requested and one or more setting values selectable on this setting screen.

In step S219, it is judged whether the setting instruction has been received from the MFP 100. The processing is advanced to step S220 if the setting instruction has been received. Otherwise, the processing is advanced to step S221. In step S220, the portable candidate value included in the setting instruction is set and the processing is returned to step S206. When the portable candidate value is the processing identification information, processing identified by the processing identification information is set as the portable-side processing and, when the portable candidate value is the setting value, the setting value is set as the portable setting value.

In step S221, it is judged whether the short-range communicator 209 has received the execution instruction from the MFP 100. The processing is advanced to step S222 if the execution instruction has been received. Otherwise, the processing is returned to step S206. In step S222, the portable-side processing is executed in cooperation with the MFP 100 in accordance with the portable setting value and the processing is returned to step S206.

<First Modification>

When the short-range communicator 119 communicates using an NFC communication technique, the user A may bring the smartphone 200A close to an antenna of the short-range communicator 119 before placing the smartphone 200A on the display surface of the display 161. In this case, the device detector 15 controls the short-range communicator 119 and the touch panel 165 such that, after the short-range communicator 119 detects the smartphone 200A and establishes the communication path, the touch panel 165 is caused to detect the position where the smartphone 200A is placed within a predetermined time.

Figure 12:
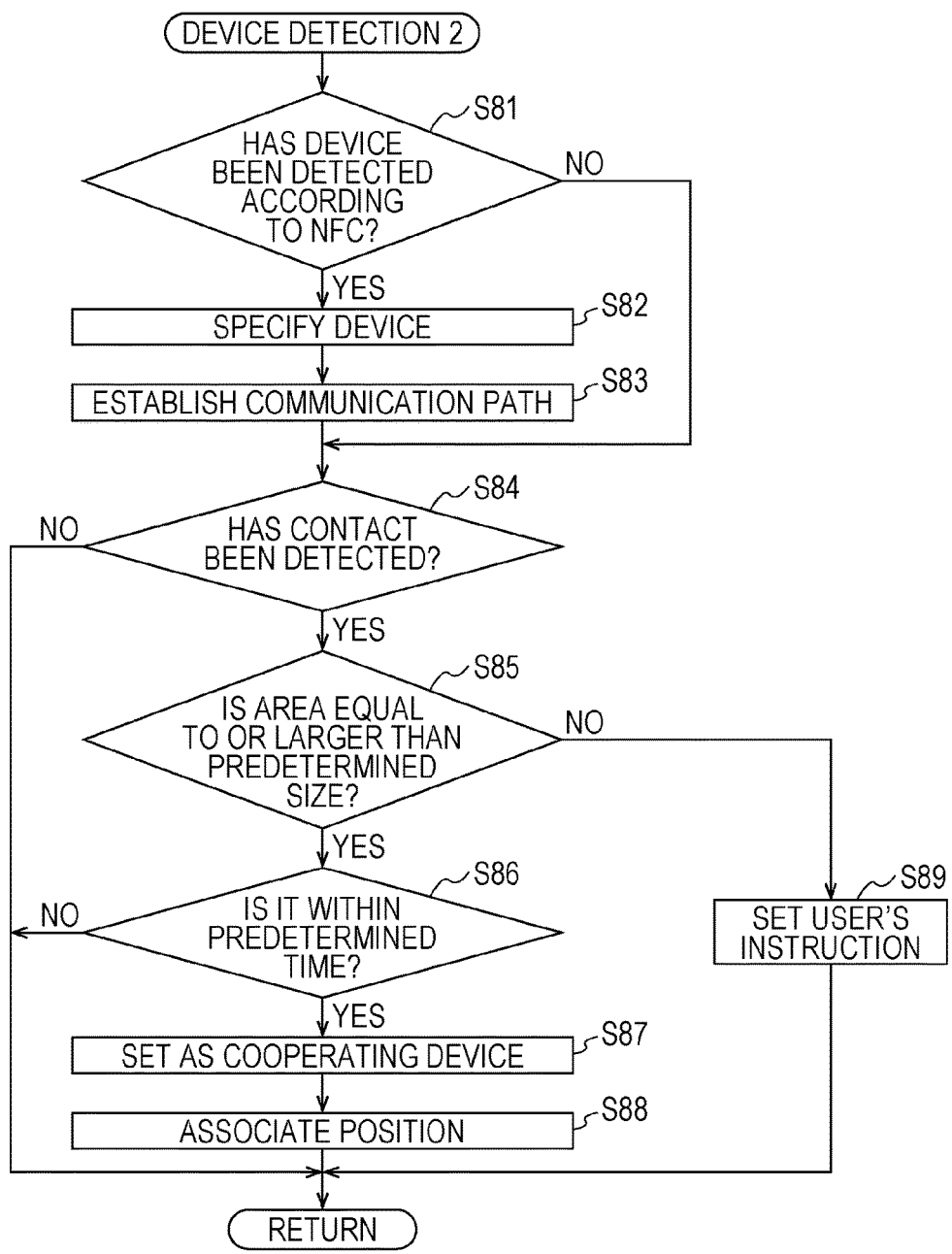
FIG. 12 is a flowchart illustrating an example of a flow of device detection processing according to a first modification according to one or more embodiments.

FIG. 12 is a flowchart illustrating an example of a flow of device detection processing according to the first modification. The device detection processing of the first modification is executed in step S01 of the cooperative processing illustrated in FIG. 8. Referring to FIG. 12, a CPU 111 judges whether a short-range communicator 119 that communicates according to an NFC standard has detected a device (step S81). The processing is advanced to step S82 if a device has been detected. Otherwise, the processing is advanced to step S84.

In step S82, the device detected by the short-range communicator 119 is specified and the processing is advanced to step S83. The device is specified by receiving the device identification information from the device. A case where a smartphone 200A is detected will be described here as an example.

In step S83, a communication I/F 112 is controlled to establish a communication path with the device specified in step S82, here, the smartphone 200A and the processing is advanced to step S84.

In step S84, it is judged whether an object has made contact with the display surface of a display 161. Specifically, when a touch panel 165 is controlled and the touch panel 165 detects a position with which the object has made contact, it is judged that the object has made contact with the display surface of the display 161. The processing is advanced to step S85 if the touch panel 165 has detected a position with which the object has made contact. Otherwise, the processing is returned to the cooperative processing.

In next step S85, it is judged whether the area of a region where the object is in contact with the display surface of display 161 is equal to or larger than a predetermined size. The predetermined size is the upper limit of the area of the user's finger. This is for distinguishing between an instruction by a finger of a person and an instruction by the smartphone 200A being laid down. The processing is advanced to step S86 if the area of the region where the object has made contact with the display surface of the display 161 is equal to or larger than the predetermined size. Otherwise, the processing is advanced to step S89. In step S89, the user's instruction is set and the processing is returned to the cooperative processing.

In step S86, it is judged whether it is within a predetermined time after the detection of the smartphone 200A in step S81. The processing is advanced to step S87 if it is within the predetermined time after the detection of the smartphone 200A. Otherwise, the processing is returned to the cooperative processing. In step S87, the smartphone 200A, which is the device specified in step S82, is set as the cooperating device and the processing is advanced to step S88. In step S88, the position detected by the touch panel 165 in step S84 is associated with the cooperating device and the processing is returned to the cooperative processing.

<Second Modification>

In the first modification, the device detector 15 causes the short-range communicator 119 that can communicate using the communication technique based on the NFC standard to detect the smartphone 200A. In a second modification, a smartphone 200A receives a radio wave from a GPS satellite to measure the current position of the smartphone 200A. A device detector 15 of the second modification acquires the current position from the smartphone 200A and settles a relative position between the smartphone 200A and an MFP 100 from the acquired current position of the smartphone 200A and a position where the MFP 100 is arranged. In this case, the smartphone 200A is detected in step S81 illustrated in FIG. 12 when the smartphone 200A is present within a predetermined range from the MFP 100.

<Third Modification>

The device detector 15 may detect the smartphone 200A using human body communication that communicates using a human body as a medium. Specifically, when communication with an integrated circuit (IC) tag capable of the human body communication owned by a user A is enabled, a device detector 15 of the third modification detects a smartphone 200A carried by the user A. In this case, the smartphone 200A carried by the user A is detected in step S81 illustrated in FIG. 12 when communication with the integrated circuit (IC) tag capable of the human body communication owned by the user A is enabled.

<Fourth Modification>

The smartphone 200A may be detected using the position of the user A managed in an entry/exit management system that manages entry and exit of the user. In this case, an MFP 100 is installed in a work room managed by the entry/exit management system and each of a plurality of users carries a unique IC tag.

The entry/exit management system has a memory storing user identification information for identifying the owner of the IC tag and a tag reader for reading the IC tag. When the user enters the work room, the user brings his/her IC tag into proximity to or in contact with the tag reader of the entry/exit management system. The tag reader detects the entry of the user by reading the IC tag that is brought into proximity or in contact and specifies the user identification information for identifying the owner of the IC tag. In addition, when the user exits the work room, the user brings his/her IC tag into proximity to or in contact with the tag reader of the entry/exit management system. The tag reader detects the exit of the user by reading the IC tag that is brought into proximity or in contact.

A device detector 15 of the fourth modification acquires, from the entry/exit management system, the position of the work room and the user identification information on the user who has entered this work room. The device detector 15 of the fourth modification acquires, from the entry/exit management system, the position of the work room and the user identification information on the user who has exited this work room. When the user who has entered the work room where the MFP 100 is arranged is specified based on a pair of the user's position and the user identification information acquired from the entry/exit management system, the device detector 15 of the fourth modification detects a smartphone carried by the specified user. For example, when the MFP 100 is arranged in a work room A, the smartphone 200A carried by the user A is detected in response to the acquisition of the position of the work room A and the user identification information on the user A from the entry/exit management system. Since the user identification information for identifying the owner of the IC tag used in the entry/exit management system is used, the user can be identified. In this case, the smartphone 200A carried by the user A is detected in step S81 illustrated in FIG. 12 in response to the acquisition of the position of the work room A and the user identification information on the user A from the entry/exit management system.

<Fifth Modification>

The MFP 100 may be provided with a function of image authentication for the user A present in the surroundings of the MFP 100 so as to detect the smartphone 200A using an authentication result. The MFP 100 includes a camera whose angle of view includes the periphery of the MFP 100 and authenticates the user A based on an image output by the camera after imaging the user A as a subject at a time point when the user A enters the angle of view of the camera. A device detector 15 of the fifth modification detects a smartphone 200A carried by a user A when the authentication of the user A is successful. In this case, the smartphone 200A carried by the user A is detected in step S81 illustrated in FIG. 12 based on an image captured by the camera when the authentication of the user A is successful.

<Sixth Modification>

The MFP 100 may detect the position of a user present in the surroundings of the MFP 100 and detect a device for which communication by the short-range communicator 119 is enabled. The MFP 100 includes a human sensor and the MFP 100 detects the position of a user present in the surroundings. The human sensor is, for example, an infrared sensor or a pyroelectric sensor. In addition, the human sensor may detect a person by extracting an image of the person from an image captured by a camera.

After a person is detected by the human sensor, a device detector 15 detects a device for which communication by a short-range communicator 119 is enabled. For example, when a user A approaches the MFP 100, the user A is detected by the human sensor. After a person is detected by the human sensor, the device detector 15 detects a smartphone 200A for which communication by the short-range communicator 119 is enabled. In this case, the smartphone 200A for which communication by the short-range communicator 119 is enabled is detected in step S81 illustrated in FIG. 12 after a person is detected by the human sensor.

<Seventh Modification>

In one or more embodiments, the MFP 100 displays the portable candidate value acquired from the smartphone 200A and causes the smartphone 200A to set the portable candidate value selected by the user. In a seventh modification, the remote operator 27 included in the MFP 100 and the remote controller 257 included in the smartphone 200A are modified.

A remote operator 27 of the seventh modification acquires the portable-side setting screen from the smartphone 200A and displays the portable-side setting screen on a display 161. Then, in response to the user A instructing a position on the portable-side setting screen, the position information indicating the position instructed on the portable-side setting screen is transmitted to the smartphone 200A. Meanwhile, a remote controller 257 of the seventh modification transmits the portable-side setting screen displayed on a display 206 to the MFP 100 and, in response to the reception of the position information from the MFP 100, specifies an operation from the position on the portable-side setting screen specified by the position information. As a result, since the MFP 100 can remotely operate the smartphone 200A, it is possible to set two devices, namely, the MFP 100 and the smartphone 200A, on the display surface of the display 161.

As described above, the MFP 100 functioning as the information processing device executes the cooperative processing in cooperation with the smartphone 200A functioning as the portable device. The MFP 100 detects the smartphone 200A in response to the touch panel 165 detecting a position with which an object has made contact and establishes a communication path with the smartphone 200A. Then, when the communication path is established with the smartphone 200A and the touch panel 165 detects the contact of the smartphone 200A, the mode is switched to the cooperation mode and, in response to the touch panel 165 no longer detecting the contact of the smartphone 200A in the cooperation mode, the related image relating to the smartphone 200A is displayed. Therefore, when the smartphone 200A leaves the display surface of the display 161, it is possible to notify the user that the cooperation mode is running.

In addition, since a virtual image imitating the appearance of the smartphone 200A is displayed as the related image, it is possible to notify by image that the cooperating device is the smartphone 200A.

In addition, since the device identification information for identifying the smartphone 200A is displayed as the related image, it is possible to specify the smartphone 200A and notify that the smartphone 200A is cooperating.

Furthermore, since the image of the portable-side setting screen displayed on the smartphone 200A is displayed as the related image, it is possible to notify the state of the smartphone 200A.

Additionally, since one or more portable-side candidate values, each of which is a candidate for the portable-side setting value that can be settled while the smartphone 200A is displaying the portable-side setting screen, are displayed on the display 161, a value settable between the smartphone 200A and the MFP 100 can be displayed on one screen.

Furthermore, since the MFP 100 transmits, to the smartphone 200A, a direction to set selected one or more portable-side candidate values in response to the selection of one or more of the displayed one or more portable-side candidate values, the one or more portable-side candidate values can be set in the smartphone 200A as the portable setting values.

In addition, since the MFP 100 enables the setting of the smartphone 200A and the setting of the MFP 100 by the drag-and-drop operation, two setting values can be set by one operation from the contact of a finger with the display surface of the display 161 until the release of the finger, whereby the operation is facilitated.

Meanwhile, when a predetermined application program is executed in the smartphone 200A, since the application identification information thereon is displayed on the display 161, the application program to be executed in the smartphone 200A can be notified.

Furthermore, when a communication path established with the smartphone 200A is disconnected, since a message for restoring the communication path is displayed, it is possible to notify the user that the communication path has been disconnected.

In addition, since the cooperation end instruction is transmitted from the smartphone 200A to the MFP 100 once the user inputs the cooperation end instruction to the smartphone 200A, the action mode of the MFP 100 can be switched to the independent mode by operating the smartphone 200A. Therefore, the user A can switch the action mode of the MFP 100 from a position away from the MFP 100.

APPENDIX (1) The cooperative system according to Item. 2, wherein the information processing device further includes the hardware processor that:

acquires one or more portable-side candidate values, each of which is a candidate for a portable-side setting value settleable by the portable device while the portable-side setting screen is being displayed;

displays the acquired one or more portable-side candidate values on the display; and transmits, in response to selection of one or more of the one or more portable-side candidate values displayed on the display by an operation accepted by the device-side acceptor, a direction to set the selected one or more portable-side candidate values to the portable device, and the portable device further includes the hardware processor that causes, in response to reception of the direction to set the selected one or more portable candidate values from the information processing device, the hardware processor to set the selected one or more portable-side candidate values as the portable-side setting values. According to one or more embodiments, the portable setting value can be set in the portable device by operating the information processing device.

Although embodiments of the present invention have been described and illustrated in detail, it is clearly understood that the same is by way of illustration and example only and not limitation, the scope of the present invention should be interpreted by terms of the appended claims. It is intended that all modifications within the meaning and scope of the claims and the equivalents thereof are included.

What is claimed is:

1. A cooperative system comprising an information processing device and a portable device carried by a user, wherein
the information processing device includes:
a display that displays an image;
a position detector that detects a position on a display surface of the display with which an object has made contact; and
a hardware processor that:
detects the portable device in response to the position detector detecting that the portable device is placed on the display surface;
establishes a communication path with the portable device;
switches an independent mode not cooperating with the portable device to a cooperation mode cooperating with the portable device when a communication path with the portable device is established and the portable device is detected by the hardware processor; and
displays a related image that is related to the portable device on the display in response to the hardware processor detecting that the portable device is removed from the display surface and the communication path is still established.

2. The cooperative system according to claim 1, wherein the portable device includes
a hardware processor that:
accepts an operation input by a user;
displays a portable-side setting screen for settling a portable-side setting value used for executing portable-side processing defined as processing to be executed by the portable device among processing in the cooperation mode;
sets the portable-side setting value settled based on an operation accepted by the hardware processor; and
executes the portable-side processing in cooperation with the information processing device based on the set portable-side setting value, and
the information processing device further includes the hardware processor that:
accepts an operation input by a user in response to the position detector detecting a position with which an object has made contact;
displays, on the display, a device-side setting screen for settling one or more device-side setting values used for executing device-side processing defined as processing to be executed by the information processing device among processing in the cooperation mode;
sets the device-side setting value settled based on an operation accepted by the hardware processor; and
executes the device-side processing in cooperation with the portable device based on the set device-side setting value.

3. The cooperative system according to claim 2, wherein the information processing device further includes the hardware processor that:
acquires one or more portable-side candidate values, each of which is a candidate for a portable-side setting value settleable by the portable device while the portable-side setting screen is being displayed;
displays the acquired one or more portable-side candidate values on the display; and
transmits, in response to selection of one or more of the one or more portable-side candidate values displayed on the display by an operation accepted by the hardware processor, a direction to set the selected one or more portable-side candidate values to the portable device, and
the portable device further includes the hardware processor that causes, in response to reception of the direction to set the selected one or more portable candidate values from the information processing device, the hardware processor to set the selected one or more portable-side candidate values as the portable-side setting values.

4. An information processing device that executes cooperative processing in cooperation with a portable device carried by a user, the information processing device comprising:
a display that displays an image;
a position detector that detects a position on a display surface of the display with which an object has made contact;
a hardware processor that:
detects the portable device in response to the position detector detecting that the portable device is placed on the display surface;
establishes a communication path with the portable device;
switches an independent mode not cooperating with the portable device to a cooperation mode cooperating with the portable device when the communication path with the portable device is established and the portable device is detected by the hardware processor; and
displays a related image that is related to the portable device on the display in response to the hardware processor detecting that the portable device is removed from the display surface and the communication path is still established.

5. The information processing device according to claim 4, wherein the related image includes a virtual image that imitates an appearance of the portable device.

6. The information processing device according to claim 4, wherein the related image includes device identification information that identifies the portable device.

7. The information processing device according to claim 4, wherein the hardware processor further acquires, from the portable device, image information on a portable-side setting screen displayed on the portable device to display on the display.

8. The information processing device according to claim 4, wherein the hardware processor further:
acquires one or more portable-side candidate values, each of which is a candidate for a portable-side setting value settleable by the portable device while the portable device displays a portable-side setting screen; and
displays the acquired one or more portable-side candidate values on the display.

9. The information processing device according to claim 8, wherein the hardware processor further:
- accepts an operation input by a user in response to the position detector detecting a position with which an object has made contact; and
- transmits, in response to selection of one or more of one or more portable-side candidate values displayed on the display by an operation accepted by the hardware processor, a direction to set the selected one or more portable-side candidate values to the portable device.

10. The information processing device according to claim 9, wherein the hardware processor further:
- displays, on the display, a device-side setting screen for settling one or more device-side setting values used for executing device-side processing defined as processing to be executed by the information processing device among processing in the cooperation mode;
- sets the device-side setting value settled based on an operation accepted by the hardware processor;
- executes the device-side processing in cooperation with the portable device based on the set device-side setting value; and
- accepts an operation of selecting one of any one of the one or more portable-side setting values displayed on the display and any one of the one or more device-side setting values selectable on the device-side setting screen, while the other is being selected.

11. The information processing device according to claim 4, wherein the hardware processor further:
- accepts an operation input by a user in response to the position detector detecting a position with which an object has made contact;
- displays, on the display, a device-side setting screen for settling one or more device-side setting values that executes device-side processing defined as processing to be executed by the information processing device among the cooperative processing;
- sets the device-side setting value settled based on an operation accepted by the hardware processor;
- executes the device-side processing in cooperation with the portable device based on the set device-side setting value;
- acquires screen information regarding a portable-side setting screen displayed by the portable device from the portable device and displays a remote operation screen on the display based on the screen information; and
- transmits a remote operation defined by the screen information to the portable device when the operation accepted by the hardware processor is an operation on the displayed remote operation screen.

12. The information processing device according to claim 4, wherein the hardware processor further displays, when a predetermined application program is executed in the portable device, application identification information that identifies the application program on the display.

13. The information processing device according to claim 4, wherein the hardware processor further notifies a user when a communication path established with the portable device is disconnected.

14. The information processing device according to claim 4, wherein the hardware processor switches an action mode to the independent mode in response to reception of end information that indicates the end of the cooperation mode from the portable device.

15. A cooperation method executed by an information processing device that executes cooperative processing in cooperation with a portable device carried by a user, wherein the information processing device comprises a display that displays an image and a position detector that detects a position on a display surface of the display with which an object has made contact, the cooperation method comprising:
- detecting the portable device in response to the position detector detecting that the portable device is placed on the display surface;
- establishing a communication path with the portable device;
- switching an independent mode not cooperating with the portable device to a cooperation mode cooperating with the portable device when a communication path with the portable device is established and the portable device is detected; and
- displaying a related image that is related to the portable device on the display in response to detecting that the portable device is removed from the display surface and the communication path is still established.

16. A non-transitory recording medium storing a computer readable cooperative program executed by a computer that controls an information processing device that executes cooperative processing in cooperation with a portable device carried by a user, wherein the information processing device includes a display that displays an image and a position detector that detects a position on a display surface of the display with which an object has made contact, the cooperative program causing the computer to execute:
- detecting the portable device in response to the position detector detecting that the portable device is placed on the display surface;
- establishing a communication path with the portable device;
- switching an independent mode not cooperating with the portable device to a cooperation mode cooperating with the portable device when a communication path with the portable device is established and the portable device is detected; and
- displaying a related image that is related to the portable device on the display in response to detecting that the portable device is removed from the display surface and the communication path is still established.

* * * * *